United States Patent
Eierhoff et al.

(10) Patent No.: US 11,896,998 B2
(45) Date of Patent: Feb. 13, 2024

(54) METHOD FOR PRODUCING A MULTICOAT PAINT SYSTEM BY POSTADDITIZATION OF AT LEAST ONE BASECOAT WITH AN AQUEOUS DISPERSION COMPRISING POLYAMIDES AND/OR AMIDE WAXES

(71) Applicant: BASF Coatings GmbH, Münster (DE)

(72) Inventors: Dirk Eierhoff, Muenster (DE); Joerg Schwarz, Muenster (DE); Silke Hellwig, Muenster (DE)

(73) Assignee: BASF COATINGS GMBH, Muenster (DE)

( * ) Notice: Subject to any disclaimer, the term of this patent is extended or adjusted under 35 U.S.C. 154(b) by 319 days.

(21) Appl. No.: 17/284,527

(22) PCT Filed: Sep. 30, 2019

(86) PCT No.: PCT/EP2019/076387
§ 371 (c)(1),
(2) Date: Sep. 8, 2021

(87) PCT Pub. No.: WO2020/074297
PCT Pub. Date: Apr. 16, 2020

(65) Prior Publication Data
US 2021/0402434 A1    Dec. 30, 2021

(30) Foreign Application Priority Data

Oct. 12, 2018 (EP) .................................... 18200046

(51) Int. Cl.
| | | |
|---|---|---|
| *B05D 7/14* | (2006.01) | |
| *B05D 7/00* | (2006.01) | |
| *C08K 3/013* | (2018.01) | |
| *C08K 5/3492* | (2006.01) | |
| *C08L 77/06* | (2006.01) | |

(52) U.S. Cl.
CPC ............. *B05D 7/572* (2013.01); *B05D 7/14* (2013.01); *C08K 3/013* (2018.01); *C08K 5/34922* (2013.01); *C08L 77/06* (2013.01); *B05D 2202/00* (2013.01); *B05D 2425/02* (2013.01); *B05D 2425/03* (2013.01); *B05D 2451/00* (2013.01); *B05D 2502/00* (2013.01); *B05D 2503/00* (2013.01); *B05D 2508/00* (2013.01); *B05D 2601/02* (2013.01); *C08L 2201/54* (2013.01)

(58) Field of Classification Search
None
See application file for complete search history.

(56) References Cited

U.S. PATENT DOCUMENTS

| | | |
|---|---|---|
| 4,914,148 A | 4/1990 | Hille et al. |
| 5,334,420 A | 8/1994 | Hartung et al. |
| 5,368,944 A | 11/1994 | Hartung et al. |
| 5,589,049 A | 12/1996 | Ott et al. |
| 5,601,880 A | 2/1997 | Schwarte et al. |
| 6,001,915 A | 12/1999 | Schwarte et al. |
| 6,274,649 B1 | 8/2001 | Ott et al. |
| 6,632,915 B1 | 10/2003 | Schwarte et al. |
| 6,737,468 B1 | 5/2004 | Bremser |
| 6,951,602 B1 | 10/2005 | Reuter et al. |
| 8,211,504 B2 | 7/2012 | Wegner et al. |
| 10,233,340 B2 | 3/2019 | Corten et al. |
| 2005/0240042 A1 | 10/2005 | Hartung et al. |
| 2006/0211821 A1* | 9/2006 | Ueda ................. C09K 3/10 525/101 |
| 2008/0220173 A1 | 9/2008 | Poppe et al. |
| 2011/0059251 A1 | 3/2011 | Poppe et al. |
| 2020/0140713 A1 | 5/2020 | Eierhoff et al. |
| 2020/0199398 A9 | 6/2020 | Corten et al. |
| 2021/0205845 A1* | 7/2021 | Corten ................. B05D 7/14 |

FOREIGN PATENT DOCUMENTS

| | | |
|---|---|---|
| CN | 107075296 A | 8/2017 |
| DE | 4009858 A1 | 10/1991 |
| DE | 4437535 A1 | 4/1996 |
| DE | 19930665 A1 | 1/2001 |
| DE | 19948004 A1 | 7/2001 |
| DE | 10043405 C1 | 6/2002 |
| EP | 0228003 B2 | 3/1994 |
| EP | 0877063 A2 | 11/1998 |

(Continued)

OTHER PUBLICATIONS

English translation of International Search Report for International Application No. PCT/EP2019/076387, dated Nov. 11, 2019, 2 pages.
European Search Report for EP Patent Application No. 18200046.3, dated Mar. 29, 2019, 3 pages.
Hermann Römpp, "Römpp Lexikon, Lacke und Druckfarben", 1998, p. 176 and 451.

*Primary Examiner* — Dah-Wei D. Yuan
*Assistant Examiner* — Kristen A Dagenais
(74) *Attorney, Agent, or Firm* — Armstrong Teasdale LLP

(57) ABSTRACT

Described herein is a method for producing a multicoat paint system by producing a basecoat or a plurality of directly successive basecoats directly on a substrate coated with a first coat, producing a clearcoat directly on the one or the topmost of the plurality of basecoats, and subsequently jointly curing the one or the plurality of basecoats and the clearcoat. At least one of the basecoat materials is admixed, directly before application, either with an aqueous dispersion (D1) including a polyamide (PA) having an acid number of 15 to 60 mg KOH/g or with an aqueous dispersion (D2) including a polyamide (PA) and an amide wax (AW).

20 Claims, No Drawings

(56) References Cited

FOREIGN PATENT DOCUMENTS

| EP | 2457961 A1 | 5/2012 | | |
|---|---|---|---|---|
| WO | 9115528 A1 | 10/1991 | | |
| WO | 9215405 A1 | 9/1992 | | |
| WO | 9316139 A1 | 8/1993 | | |
| WO | 9833835 A1 | 8/1998 | | |
| WO | 0102498 A1 | 1/2001 | | |
| WO | 2004018580 A1 | 3/2004 | | |
| WO | 2006042585 A1 | 4/2006 | | |
| WO | 2008074490 A1 | 6/2008 | | |
| WO | 2009077182 A1 | 6/2009 | | |
| WO | 2009100938 A1 | 8/2009 | | |
| WO | 2014033135 A2 | 3/2014 | | |
| WO | 2017088988 A1 | 6/2017 | | |
| WO | 2017140380 A1 | 8/2017 | | |
| WO | WO-2017140380 A1 * | 8/2017 | ............. | B05D 1/007 |
| WO | 2018172476 A1 | 9/2018 | | |

* cited by examiner

METHOD FOR PRODUCING A MULTICOAT PAINT SYSTEM BY POSTADDITIZATION OF AT LEAST ONE BASECOAT WITH AN AQUEOUS DISPERSION COMPRISING POLYAMIDES AND/OR AMIDE WAXES

The present invention relates to a method for producing a multicoat paint system by producing a basecoat or a plurality of directly successive basecoats directly on a substrate coated with a first coat, producing a clearcoat directly on the one or the topmost of the plurality of basecoats, and subsequently jointly curing the one or the plurality of basecoats and the clearcoat. At least one of the basecoat materials is admixed, directly before application, either with an aqueous dispersion (D1) comprising a polyamide (PA) having an acid number of 15 to 60 mg KOH/g or with an aqueous dispersion (D2) comprising a polyamide (PA) and an amide wax (AW).

PRIOR ART

Multicoat paint systems on substrates, examples being multicoat paint systems in the automobile industry sector, are known. Starting, conceptually, from the substrate, such multicoat paint systems generally comprise a first coat, in particular an electrocoat, a coat applied directly to the electrocoat and commonly referred to as primer-surfacer coat, at least one coat which comprises color and/or effect pigments and is generally referred to as a basecoat, and also a clearcoat.

The fundamental compositions and functions of the stated coats, and the coating compositions necessary to the construction of these coats, namely electrocoat materials, primer-surfacers, coating compositions that comprise color and/or effect pigments and are known as basecoat materials, and clearcoat materials, are known. For example, the electrophoretically applied electrocoat serves fundamentally to protect the substrate from corrosion. The primer-surfacer coat serves primarily to protect against mechanical exposure such as stone chipping, for example, and also to level out unevennesses in the substrate. The next coat, called the basecoat, is primarily responsible for producing esthetic qualities such as the color and/or effects such as the flop, while the clearcoat that then follows serves in particular for scratch resistance and also for gloss on the part of the multicoat paint system.

In the prior art these multicoat paint systems are produced by first applying or depositing a first coat, more particularly a cathodic electrocoat material, electrophoretically on the substrate, an automobile body, for example. The substrate may undergo various pretreatments before the electrocoat material is deposited: for example, known conversion coatings such as phosphate coats, more particularly zinc phosphate coats, may be applied. The operation of depositing the electrocoat material takes place generally in corresponding electrocoating tanks. Following application, the coated substrate is removed from the tank, optionally rinsed and flashed and/or subjected to interim drying, and finally the applied electrocoat material is cured. The aim here is for coat thicknesses of around 15 to 25 micrometers. The primer-surfacer is then applied directly to the cured electrocoat, with optional flashing and/or interim drying, and subsequent curing. To allow the cured primer-surfacer coat to fulfill the functions identified above, coat thicknesses of 25 to 45 micrometers, for example, are the aim. Next, directly atop the cured primer-surfacer coat, a basecoat material is applied, comprising color and/or effect pigments, which is optionally flashed and/or subjected to interim drying, and a clearcoat material is applied directly to the thus-produced basecoat, without separate curing. The basecoat and the clearcoat, optionally likewise flashed and/or subjected to interim drying beforehand, are then jointly cured (wet-on-wet method). Whereas the cured basecoat in principle has comparatively low coat thicknesses of 10 to 20 micrometers, for example, the aim for the cured clearcoat is for coat thicknesses of 30 to 60 micrometers, for example, in order to attain the technological applications properties described. Applying primer-surfacer, basecoat, and clearcoat materials can be done using, for example, the techniques of application, known to the skilled person, of pneumatic and/or electrostatic spray application. Primer-surfacer and basecoat materials are nowadays being used, simply for environmental reasons, increasingly in the form of aqueous coating materials.

Multicoat paint systems of these kinds, and methods for producing them, are described in, for example, DE 199 48 004 A1, page 17, line 37, to page 19, line 22, or else DE 100 43 405 C1, column 3, paragraph [0018], and column 8, paragraph [0052] to column 9, paragraph [0057], in conjunction with column 6, paragraph [0039] to column 8, paragraph [0050].

Although the multicoat paint systems produced accordingly may generally meet the requirements imposed by the automotive industry in terms of technological applications properties and esthetic profile, the focus of the automakers nowadays is increasingly coming to rest, as a result of environmental and economic factors, on the simplification of the comparatively complex production operation described.

So there are approaches which attempt to do without the separate step of curing the coating composition applied directly to the cured electrocoat (that is, the coating composition referred to as primer-surfacer within the standard method described above), and at the same time, possibly, to lower the coat thickness of the coating film produced from this coating composition, as well. Within the art, this coating film, which is therefore not separately cured, is then frequently called the basecoat (and no longer the primer-surfacer coat) or, to distinguish it from a second basecoat film applied atop it, it is called the first basecoat film. In some cases an attempt is even made to do entirely without this coating film (in which case, then, merely a so-called basecoat film is produced directly on the electrocoat film, over which, without a separate curing step, a clearcoat material is applied; in other words, ultimately, a separate curing step is likewise omitted). In place of the separate curing step and of an additional concluding curing step, then, the intention is to have merely one, concluding curing step following application of all of the coating films applied to the electrocoat film.

Avoiding a separate curing step for the coating composition applied directly to the electrocoat is very advantageous from environmental and economic aspects. The reason is that it saves energy and allows the production operation as a whole to proceed with substantially less stringency, of course.

Instead of the separate curing step, then, it is an advantage for the coating produced directly on the electrocoat to be merely flashed at room temperature and/or subjected to interim drying at elevated temperatures, without carrying out curing which, as is known, regularly necessitates elevated curing temperatures and/or long curing times.

A problem, however, is that with this form of production, it is nowadays often not possible to obtain the requisite technological applications properties and esthetic properties.

For instance, as a result of the absence of separate curing of the coating applied directly to the electrocoat, the first basecoat, for example, prior to the application of further coating compositions, such as a second basecoat material and a clearcoat material, for example, there may be unwanted inclusions of air, solvent and/or moisture, which may manifest themselves in the form of blisters beneath the surface of the overall paint system and may break open during the concluding cure. The holes which are formed as a result of this in the paint system, such holes also being called pinholes and pops, lead to a deleterious visual appearance. The amount of organic solvent and/or water arising as a result of the overall construction of first basecoat, second basecoat, and clearcoat, and also the amount of air introduced through the application method, is too great for the entire amount to be able to escape from the multicoat paint system within a concluding curing step without defects being produced.

It may further occur that the basecoat applied directly to the first coat (primer-surfacer or first basecoat) slumps from the first layer after the end of the coating operation. This effect of slumping, also known as slippage to the skilled person, occurs in particular when
- the first basecoat has a high film thickness, or
- the second basecoat is applied wet, by means of a high discharge rate and/or low rotary speed, for example, or
- the flash-off time between application of the first and second basecoats is small or
- the differences in polarity between the first and second basecoats are high, or
- the stability of the first basecoat material is reduced as a result of aging, storage or shearing.

In the case of a conventional production operation as described above, in which the primer-surfacer coat is baked separately prior to the production of a usually comparatively thin basecoat (which hence has only a comparatively low air, organic solvents and/or water content), the solution to this problem is of course much less demanding.

However, the problems described with pinholes, pops and slumping are also frequently encountered in the production of multicoat paint systems where the use of the coating composition identified as a primer-surfacer in the standard operation is forgone entirely, in other words systems in which, consequently, only a basecoat material is applied direct to the cured first coat. The reason is that, depending on the application and use of the multicoat paint system to be produced, in the case of complete absence of the coating referred to as a primer-surfacer coat in standard operation, the thickness of basecoat required is generally greater than that in the standard systems, in order to obtain the desired properties. In this case as well, therefore, the overall film thickness of coating films which must be cured in the concluding curing step is substantially higher than in standard operation.

Other relevant properties as well are not always satisfactorily achieved when multicoat paint systems are built up by way of the methods described above. For example, the attainment of a high-grade overall appearance, which is influenced in particular by effective leveling on the part of the coating compositions used, represents a challenge. Here, the rheological properties of the coating compositions must be custom-tailored to the operating regime described. Similar comments apply in relation to retention of appropriate stability against runs. A further difficulty is that of obtaining adequate stability.

It would therefore be advantageous to have a method for producing multicoat paint systems that removes the need for a separate curing step, as described above, for the coating composition applied directly to the first coat, with the multicoat paint system produced nevertheless having excellent technological applications properties, more particularly esthetic properties.

Problem and Solution

A problem addressed by the present invention, accordingly, was that of finding a method for producing a multicoat paint system on substrates wherein the coating composition applied directly to the first coat is not cured separately, but instead this coating composition is cured in a joint curing step with further coating films applied subsequently. In spite of this simplification of method, the resultant multicoat paint systems ought to exhibit outstanding technological applications properties, more particularly esthetic properties and stabilities. Moreover, it ought in this way to be possible to provide, according to requirements and individual area of use, multicoat paint systems in which the one or the two or more coating film(s) disposed between first coat and clearcoat can have variable coat thicknesses and in which in particular no problems with pinholes and slumping occur even at relatively high coat thicknesses.

Furthermore, it ought to be possible to eliminate sag resistance problems arising during the production of multicoat paint systems by simply adapting the composition of the coat or coats disposed between the first coat and the clearcoat, during the production of the multicoat paint systems, and in this way to avoid or reduce the holding in stock of different basecoat compositions for each shade. The adaptation of the composition, however, ought not to result in any significant change to the high-shear or low-shear viscosity, since such alterations may result in an adverse effect on the appearance, the run properties, and the shade.

Solution of the Problem

It has been found that the problems identified can be solved by means of a new method for producing a multicoat paint system (M) on a substrate (S), comprising
(1) optionally producing a cured first coat (S1) on the substrate (S) by application of a composition (Z1) to the substrate (S) and subsequent curing of the composition (Z1),
(2) producing a basecoat (BL2a) or two or more directly successive basecoats (BL2-x) directly on the first coat (S1) by application of an aqueous basecoat material (bL2a) directly to the first coat (S1) or directly successive application of two or more aqueous basecoat materials (bL2-x) to the first coat (S1),
(3) producing a clearcoat (K) directly on the basecoat (BL2a) or the topmost basecoat (BL2-z) by application of a clearcoat material (kL) directly to the basecoat (BL2a) or the topmost basecoat (BL2-z),
(4) jointly curing the basecoat (BL2a) and the clearcoat (K) or the basecoats (BL2-x) and the clearcoat (K),
wherein
the at least one basecoat material (bL2a) or at least one of the basecoat materials (bL2-x), directly prior to application, is mixed with an aqueous dispersion (D1) comprising at least one polyamide (PA) having an acid number of 15 to 60 mg KOH/g or with an aqueous dispersion (D2) comprising at least one polyamide (PA) and at least one amide wax (AW).

The method specified above is also referred to below as method of the invention and is correspondingly a subject of the present invention. Preferred embodiments of the method of the invention are apparent from the description hereinafter and from the dependent claims.

The method of the invention allows multicoat paint systems to be produced without a separate curing step for the coating produced directly on the first coat. For greater ease of comprehension, this coating for the purposes of the present invention is referred to as basecoat. Instead of separate curing, this basecoat is jointly cured together with optionally further basecoats beneath the clearcoat, and with the clearcoat. The addition of the aqueous dispersion (D1) or the addition of the aqueous dispersion (D2) directly before application of the basecoat material (also referred to hereinafter as postadditization) makes it possible effectively to eliminate sag resistance problems occurring during multicoat finishing and in this way to prevent or reduce the holding in stock of different basecoat compositions for each shade. Postadditization, moreover, also enables the further use of basecoat compositions which because of the sag resistance problems that occur are outside of the specification and must therefore be disposed of. The method of the invention therefore exhibits an improved environmental balance and efficiency in relation to the basecoat compositions employed.

Indeed, the skilled person is well aware of responding to sag resistance problems that occur by adapting the rheology of the basecoat composition and, for example, adding thickeners. However, it was surprising that only on addition of certain thickeners, namely the aqueous dispersion (D1) or the aqueous dispersion (D2), is it possible to eliminate the sag resistance problems, without adversely affecting the esthetic and mechanical qualities achieved with the coating system. In spite of low energy input, these thickeners can be incorporated homogeneously into the basecoat composition and can therefore be added to the basecoat composition at any time, as and when required, during the production of the multicoat paint system, before the basecoat composition is applied.

COMPREHENSIVE DESCRIPTION

Definitions

First of all a number of terms used in the context of the present invention will be explained.

The application of a coating material to a substrate, and the production of a coating film on a substrate, are understood as follows. The coating material in question is applied such that the coating film produced therefrom is disposed on the substrate, but need not necessarily be in direct contact with the substrate. For example, between the coating film and the substrate, there may be other coats disposed. In step (1), for example, the cured first coat (S1) is produced on the metallic substrate (S), but between the substrate and the first coat (S1) there may also be a conversion coating disposed, as described later on below, such as, for example, a zinc phosphate coat.

The same principle applies to the application of a coating material (b) to a coating film (A) produced by means of another coating material (a), and to the production of a coating film (B) on another coating film (A). The coating film (B) need not necessarily be in contact with the coating film (A), being required merely to be disposed above it, in other words on the side of the coating film (A) that is remote from the substrate.

In contrast to this, the application of a coating material directly to a substrate, or the production of a coating film directly on a substrate, is understood as follows. The coating material in question is applied such that the coating film produced therefrom is disposed on the substrate and is in direct contact with the substrate. In particular, therefore, there is no other coat disposed between coating film and substrate.

The same applies, of course, to the application of a coating material (b) directly to a coating film (A) produced by means of another coating material (a), and to the production of a coating film (B) directly on another coating film (A). In this case the two coating films are in direct contact, being therefore disposed directly on one another. In particular there is no further coat between the coating films (A) and (B). The same principle of course applies to directly successive application of coating materials and to the production of directly successive coating films.

Flashing, interim drying, and curing are understood in the context of the present invention to have the same semantic content as that familiar to the skilled person in connection with methods for producing multicoat paint systems.

The term "flashing" is understood accordingly in principle as a designation for the passive or active evaporation of organic solvents and/or water from a coating material applied as part of the production of a paint system, usually at ambient temperature (that is, room temperature), 15 to 35° C. for example, for a duration of 0.5 to 30 minutes, for example. Flashing is accompanied therefore by evaporation of organic solvents and/or water present in the applied coating material. Since the coating material is still fluid, at any rate directly after application and at the beginning of flashing, it may flow in the course of flashing. The reason is that at least one coating material applied by spray application is applied generally in the form of droplets and not in a uniform thickness. As a result of the organic solvents and/or water it comprises, however, the material is fluid and may therefore undergo flow to form a homogeneous, smooth coating film. At the same time, there is successive evaporation of organic solvents and/or water, resulting after the flashing phase in a comparatively smooth coating film, which comprises less water and/or solvent in comparison with the applied coating material. After flashing, however, the coating film is not yet in the service-ready state. While it is no longer flowable, for example, it is still soft and/or tacky, and possibly is only partly dried. In particular, the coating film is not yet cured as described later on below.

Interim drying is thus understood likewise to refer to the passive or active evaporation of organic solvents and/or water from a coating material applied as part of the production of a paint system, usually at a temperature increased relative to the ambient temperature and amounting, for example, to 40 to 90° C., for a duration of 1 to 60 minutes, for example. In the course of interim drying as well, therefore, the applied coating material will lose a fraction of organic solvents and/or water. Based on a particular coating material, the general rule is that interim drying, by comparison with flashing, proceeds for example at higher temperatures and/or for a longer time period, meaning that, by comparison with flashing, there is also a higher fraction of organic solvents and/or water that escapes from the applied coating film. Even interim drying, however, does not result in a coating film in the service-ready state, in other words not a cured coating film as described later on below. A typical sequence of flashing and interim drying would be, for example, the flashing of an applied coating film at ambient temperature for 3 minutes and then its interim drying at 60° C. for 10 minutes. A conclusive delimitation of the two concepts from one another, however, is neither necessary nor desirable. For the sake of pure comprehension, these terms are used in order to make it clear that variable and sequential conditioning of a coating film can take place, prior to the curing described below. Here, depending on the coating material, the evaporation temperature and evaporation time, greater or lesser fractions of the organic solvents and/or water present in the coating material may evaporate. It is even possible here, optionally, for a fraction of the polymers present as binders in the coating material to undergo crosslinking or interlooping with one another as described below. Both in flashing and in interim drying, however, the kind of service-ready coating film that is the case for the curing described below is not obtained. Accordingly, curing is unambiguously delimited from flashing and interim drying.

The curing of a coating film is understood accordingly to be the conversion of such a film into the service-ready state, in other words into a state in which the substrate furnished with the coating film in question can be transported, stored, and used in its intended manner. A cured coating film, then, is in particular no longer soft or tacky, but instead is conditioned as a solid coating film which, even on further exposure to curing conditions as described later on below, no longer exhibits any substantial change in its properties such as hardness or adhesion to the substrate.

As is known, coating materials may in principle be cured physically and/or chemically, depending on components present such as binders and crosslinking agents. In the case of chemical curing, consideration is given to thermochemical curing and actinic-chemical curing. Where, for example, a coating material is thermochemically curable, it may be self-crosslinking and/or externally crosslinking. The indication that a coating material is self-crosslinking and/or externally crosslinking means, in the context of the present invention, that this coating material comprises polymers as binders and optionally crosslinking agents that are able to crosslink with one another correspondingly. The parent mechanisms and also binders and crosslinking agents (film-forming components) that can be used are described later on below.

In the context of the present invention, "physically curable" or the term "physical curing" means the formation of a cured coating film by loss of solvent from polymer solutions or polymer dispersions, with the curing being achieved by interlooping of polymer chains. Coating materials of these kinds are generally formulated as one-component coating materials.

In the context of the present invention, "thermochemically curable" or the term "thermochemical curing" means the crosslinking of a coating film (formation of a cured coating film) initiated by chemical reaction of reactive functional groups, where the energetic activation of this chemical reaction is possible through thermal energy. Different functional groups which are complementary to one another can react with one another here (complementary functional groups), and/or the formation of the cured coat is based on the reaction of autoreactive groups, in other words functional groups which react among one another with groups of their own kind. Examples of suitable complementary reactive functional groups and autoreactive functional groups are known from German patent application DE 199 30 665 A1, page 7, line 28, to page 9, line 24, for example.

This crosslinking may be self-crosslinking and/or external crosslinking. Where, for example, the complementary reactive functional groups are already present in an organic polymer used as binder, as for example in a polyester, a polyurethane, or a poly-(meth)acrylate, self-crosslinking occurs. External crosslinking occurs, for example, when a (first) organic polymer containing certain functional groups, hydroxyl groups for example, reacts with a crosslinking agent known per se, as for example with a polyisocyanate and/or a melamine resin. The crosslinking agent, then, contains reactive functional groups which are complementary to the reactive functional groups present in the (first) organic polymer used as binder.

In the case of external crosslinking in particular, the one-component and multicomponent systems, more particularly two-component systems, that are known per se are contemplated.

In thermochemically curable one-component systems, the components for crosslinking, as for example organic polymers as binders and crosslinking agents, are present alongside one another, in other words in one component. A requirement for this is that the components to be crosslinked react with one another—that is, enter into curing reactions—only at relatively high temperatures of more than 100° C., for example. Otherwise it would be necessary to store the components for crosslinking separately from one another and to mix them with one another only shortly before application to a substrate, in order to prevent premature at least proportional thermochemical curing (compare two-component systems). As an exemplary combination, mention may be made of hydroxy-functional polyesters and/or polyurethanes with melamine resins and/or blocked polyisocyanates as crosslinking agents.

In thermochemically curable two-component systems, the components that are to be crosslinked, as for example the organic polymers as binders and the crosslinking agents, are present separately from one another in at least two components, which are not combined until shortly before application. This form is selected when the components for crosslinking undergo reaction with one another even at ambient temperatures or slightly elevated temperatures of 40 to 90° C., for example. As an exemplary combination, mention may be made of hydroxy-functional polyesters and/or polyurethanes and/or poly(meth)acrylates with free polyisocyanates as crosslinking agent.

It is also possible for an organic polymer as binder to have both self-crosslinking and externally crosslinking functional groups, and to be then combined with crosslinking agents.

In the context of the present invention, "actinic-chemically curable", or the term "actinic-chemical curing", refers to the fact that the curing is possible with application of actinic radiation, this being electromagnetic radiation such as near infrared (NIR) and UV radiation, more particularly UV radiation, and also particulate radiation such as electron beams. The curing by UV radiation is initiated customarily by radical or cationic photoinitiators. Typical actinically curable functional groups are carbon-carbon double bonds, with radical photoinitiators generally being employed in that case. Actinic curing, then, is likewise based on chemical crosslinking.

Of course, in the curing of a coating material identified as chemically curable, there will always be physical curing as well, in other words the interlooping of polymer chains. The physical curing may even be predominant. Provided it includes at least a proportion of film-forming components that are chemically curable, nevertheless, a coating material of this kind is identified as chemically curable.

It follows from the above that according to the nature of the coating material and the components it comprises, curing is brought about by different mechanisms, which of course also necessitate different conditions at the curing stage, more particularly different curing temperatures and curing times.

In the case of a purely physically curing coating material, curing takes place preferably between 15 and 90° C. over a period of 2 to 48 hours. In this case, then, the curing differs from the flashing and/or interim drying, where appropriate, solely in the duration of the conditioning of the coating film. Differentiation between flashing and interim drying, moreover, is not sensible. It would be possible, for example, for a coating film produced by application of a physically curable coating material to be subjected to flashing or interim drying first of all at 15 to 35° C. for a duration of 0.5 to 30 minutes, for example, and then to be cured at 50° C. for a duration of 5 hours.

Preferably, however, at least some of the coating materials for use in the context of the method of the invention, in other words electrocoat materials, aqueous basecoat materials, and clearcoat materials, are thermochemically curable, and especially preferably are thermochemically curable and externally crosslinking.

In principle, and in the context of the present invention, the curing of thermochemically curable one-component systems is carried out preferably at temperatures of 100 to 250° C., preferably 100 to 180° C., for a duration of 5 to 60 minutes, preferably 10 to 45 minutes, since these conditions are generally necessary in order for chemical crosslinking reactions to convert the coating film into a cured coating film. Accordingly it is the case that a flashing and/or interim drying phase taking place prior to curing takes place at lower temperatures and/or for shorter times. In such a case, for example, flashing may take place at 15 to 35° C. for a duration of 0.5 to 30 minutes, for example, and/or interim drying may take place at a temperature of 40 to 90° C., for example, for a duration of 1 to 60 minutes, for example.

In principle, and in the context of the present invention, the curing of thermochemically curable two-component systems is carried out at temperatures of 15 to 90° C., for example, in particular 40 to 90° C., for a duration of 5 to 80 minutes, preferably 10 to 50 minutes. Accordingly it is the case that a flashing and/or interim drying phase occurring prior to curing takes place at lower temperatures and/or for shorter times. In such a case, for example, it is no longer sensible to make any distinction between the concepts of flashing and interim drying. A flashing or interim drying phase which precedes curing may take place, for example, at 15 to 35° C. for a duration of 0.5 to 30 minutes, for example, but at any rate at lower temperatures and/or for shorter times than the curing that then follows.

This of course is not to rule out a thermochemically curable two-component system being cured at higher temperatures. For example, in step (4) of the method of the invention as described with more precision later on below, a basecoat film or two or more basecoat films are cured jointly with a clearcoat film. Where both thermochemically curable one-component systems and two-component systems are present within the films, such as a one-component basecoat material and a two-component clearcoat material, for example, the joint curing is of course guided by the curing conditions that are necessary for the one-component system.

All temperatures elucidated in the context of the present invention should be understood as the temperature of the room in which the coated substrate is located. It does not mean, therefore, that the substrate itself is required to have the temperature in question.

The measurement methods to be employed in the context of the present invention for determining certain characteristic variables are evident from the Examples section. Unless explicitly indicated otherwise, these measurement methods are to be used for determining the respect characteristic variable.

Where reference is made in the context of the present invention to an official standard, without indication of the official validity period, the reference is of course to the version of the standard valid on the filing date or, if there is no valid version at that date, the most recent valid version.

The aqueous dispersion comprising at least one polyamide (PA) having a specific acid number, or the aqueous dispersion comprising a polyamide (PA) and an amide wax (AW), is mixed with the basecoat material directly prior to the application of that material. This means that the addition of the aqueous dispersion takes place during the production of the multicoat paint system, more particularly shortly before the use of the basecoat composition within the method of the invention. Conversely, in the context of the present invention, the term "directly prior to application" does not include either the addition of the aqueous dispersion during the production of the basecoat composition, or the addition of the aqueous dispersion directly after production of the basecoat composition.

Method of the Invention

In the method of the invention, a multicoat paint system is built up on a substrate (S).

With preference in accordance with the invention, the substrate (S) is selected from metallic substrates, plastics, and mixtures thereof, more particularly from metallic substrates.

Metallic substrates (S) contemplated essentially include substrates comprising or consisting of, for example, iron, aluminum, copper, zinc, magnesium, and alloys thereof, and also steel, in any of a very wide variety of forms and compositions. Preferred substrates are those of iron and steel, examples being typical iron and steel substrates as used in the automobile industry sector.

Before step (1) of the method of the invention, the metallic substrates (S) may be pretreated in a conventional way—that is, for example, cleaned and/or provided with known conversion coatings. Cleaning may be accomplished mechanically, for example, by means of wiping, sanding and/or polishing, and/or chemically by means of pickling methods, by incipient etching in acid or alkali baths, by means of hydrochloric or sulfuric acid, for example. Cleaning with organic solvents or aqueous cleaners is of course also possible. Pretreatment may likewise take place by application of conversion coatings, more particularly by means of phosphating and/or chromating, preferably phosphating. In any case, the metallic substrates are preferably conversion-coated, more particularly phosphatized, preferably provided with a zinc phosphate coat.

Suitable plastics substrates (S) are in principle substrates comprising or consisting of (i) polar plastics, such as polycarbonate, polyamide, polystyrene, styrene copolymers, polyesters, polyphenyl oxides, and blends of these plastics, (ii) reactive plastics, such as PUR-RIM, SMC, BMC, and also (iii) polyolefin substrates of the polyethylene and polypropylene types with a high rubber content, such as PP-EPDM, and also surface-activated polyolefin substrates. The plastics may also be fiber-reinforced, more particularly using carbon fibers and/or metal fibers. Substrates of plastic (S) as well may be pretreated, more particularly by cleaning, before step (1) of the method of the invention, in order to improve the adhesion of the first coat (S1).

As substrates (S) it is also possible, moreover, to use those which contain both metallic and plastics fractions. Substrates of this kind are, for example, vehicle bodies containing plastics parts.

The shape of the substrates is arbitrary per se, meaning that they may, for example, be simple parts or else complex components such as, in particular, automobile bodies and parts thereof.

Step (1):

Step (1) of the method of the invention is an optional step. This step is carried out especially when the substrate (S) is a metallic substrate. If a substrate (S) made of plastic is used in the method of the invention, on the other hand, it is preferred in accordance with the invention if this step is not carried out; in this case, in other words, the method of the invention commences directly with step (2).

The composition (Z1) may be an electrocoat material and may also be a primer coat. A primer coat in accordance with the invention, however, is not the basecoat applied in step (2) of the method of the invention. The method of the invention is preferably carried out with metallic substrates (S). The first coat (S1), therefore, is more particularly a cured electrocoat (E1). In one preferred embodiment of the method of the invention, accordingly, the composition (Z1) is an electrocoat material (ETL1) which is applied electrophoretically to the substrate (S).

The electrocoat material (ETL1) used in step (1) of the method of the invention may be a cathodic or anodic electrocoat material. Preferably it is a cathodic electrocoat material. Electrocoat materials have long been known to the skilled person. They are aqueous coating materials which must be suitable for electrophoretic application to a metallic substrate. They comprise at any rate anionic or cationic polymers as binders. These polymers contain functional groups which are potentially anionic, meaning that they can be converted into anionic groups, carboxylic acid groups for example, or contain functional groups which are potentially cationic, meaning that they can be converted into cationic groups, amino groups for example. Conversion into charged groups is achieved generally through the use of corresponding neutralizing agents (organic amines (anionic), organic carboxylic acids such as formic acid (cationic)), with the anionic or cationic polymers then being produced as a result. The electrocoat materials generally and hence preferably further comprise typical anticorrosion pigments. The cathodic electrocoat materials that are preferred in the invention preferably comprise cationic polymers as binders, more particularly hydroxy-functional polyetheramines, which preferably have aromatic structural units. Such polymers are generally obtained by reaction of corresponding bisphenol-based epoxy resins with amines such as mono- and dialkylamines, alkanolamines and/or dialkylamino-alkylamines, for example. These polymers are used more particularly in combination with conventional blocked polyisocyanates. Reference may be made, by way of example, to the electrocoat materials described in WO 9833835 A1, WO 9316139 A1, WO 0102498 A1, and WO 2004018580 A1.

The electrocoat material (ETL1) is therefore preferably an at any rate thermochemically curable coating material, and more particularly it is externally crosslinking. Preferably the electrocoat material (ETL1) is a thermochemically curable one-component coating material. The electrocoat material (ETL1) preferably comprises a hydroxy-functional epoxy resin as binder and a fully blocked polyisocyanate as crosslinking agent. The epoxy resin is preferably cathodic, more particularly containing amino groups.

Also known is the electrophoretic application of an electrocoat material (ETL1) of this kind that takes place in step (1) of the method of the invention. Application proceeds electrophoretically. This means that first of all the metallic workpiece for coating is immersed into a dipping bath comprising the coating material, and an electrical direct-current field is applied between the metallic workpiece and a counterelectrode. The workpiece therefore serves as the electrode; because of the described charge on the polymers used as binders, the nonvolatile constituents of the electrocoat material migrate through the electrical field to the substrate and are deposited on the substrate, producing an electrocoat film. In the case of a cathodic electrocoat material, for example, the substrate is connected accordingly as the cathode, and the hydroxide ions that form there as a result of the electrolysis of water carry out neutralization of the cationic binder, causing it to be deposited on the substrate and an electrocoat film to be formed. The method is therefore one of application by electrophoretic deposition.

Following the application of the electrocoat material (ETL1), the coated substrate (S) is removed from the tank, optionally rinsed with water-based rinsing solutions, for example, then optionally subjected to flashing and/or interim drying, and lastly the applied electrocoat material is cured.

The applied electrocoat material (ETL1) (or the applied, as yet uncured electrocoat film) is subjected to flashing at 15 to 35° C., for example, for a duration of 0.5 to 30 minutes, for example, and/or to interim drying at a temperature of preferably 40 to 90° C. for a duration of 1 to 60 minutes, for example.

The electrocoat material (ETL1) applied to the substrate (or the applied, as yet uncured electrocoat film) is cured preferably at temperatures of 100 to 250° C., preferably 140 to 220° C., for a duration of 5 to 60 minutes, preferably 10 to 45 minutes, thereby producing the cured electrocoat (E1).

The flashing, interim-drying, and curing conditions stated apply in particular to the preferred case where the electrocoat material (ETL1) comprises a thermochemically curable one-component coating material as described above. This, however, does not rule out the electrocoat material being an otherwise-curable coating material and/or the use of different flashing, interim-drying, and curing conditions.

The film thickness of the cured electrocoat is, for example, 10 to 40 micrometers, preferably 15 to 25 micrometers. All film thicknesses reported in the context of the present invention should be understood as dry film thicknesses. It is therefore the thickness of the cured film in each case. Hence, where it is reported that a coating material is applied at a particular film thickness, this means that the coating material is applied in such a way as to result in the stated film thickness after curing.

Step (2):

In step (2) of the method of the invention, a basecoat film (BL2a) is produced (alternative 1), or two or more directly successive basecoat films (BL2-x) are produced (alternative 2). The films are produced by application of an aqueous basecoat material (bL2a) directly to the cured coat (S1), or by directly successive application of two or more basecoat materials (bL2-x) to the cured coat (S1). After having been produced, therefore, the basecoat film (BL2a) according to alternative 1 of step (2) is disposed directly on the cured first coat (S1).

The terms basecoat material and basecoat film, in relation to the coating materials applied and coating films produced in step (2) of the method of the invention, are used for greater ease of comprehension. The basecoat films (BL2a) and (BL2-x) are not cured separately, but are instead cured jointly with the clearcoat material. Curing therefore takes place in analogy to the curing of basecoat materials employed in the standard process described in the introduction. In particular, the coating materials used in step (2) of the method of the invention are not cured separately like the coating materials identified as surfacers in the standard process.

The directly successive application of two or more basecoat materials (bL2-x) to the cured first coat (S1) therefore means that first of all a first basecoat material is applied directly to the coat (S1) and thereafter a second basecoat material is applied directly to the film of the first basecoat material. An optional third basecoat material is then applied directly to the film of the second basecoat material. This procedure can then be repeated analogously for further basecoat materials (i.e., a fourth, fifth, etc. basecoat material). In this context, the following designation is appropriate. The basecoat materials and basecoat films are labeled generally as (bL2-x) and (BL2-x), whereas the x may be replaced by other letters which match accordingly when designating the specific individual basecoat materials and basecoat films.

The first basecoat material and the first basecoat film may be labeled with a; the topmost basecoat material and the topmost basecoat film may be labeled with z. These two basecoat materials and basecoat films are therefore present in any case. Any films between them may be given serial labeling as b, c, d and so on.

Through the application of the first basecoat material (bL2-a), accordingly, a basecoat film (BL2-a) is produced directly on the cured first coat (S1). The at least one further basecoat film (BL2-x) is then produced directly on the basecoat film (BL2-a). Where two or more further basecoat films (BL2-x) are produced, they are produced in direct succession. For example, there may be exactly one further basecoat film (BL2-x) produced, in which case this film is disposed directly beneath the clearcoat film (K) in the multicoat paint system ultimately produced, and may therefore be termed basecoat film (BL2-z). Also possible, for example, is the production of two further basecoat films (BL2-x), in which case the film produced directly on the basecoat (BL2-a) may be designated as (BL2-b), and the film arranged lastly directly beneath the clearcoat film (K) may be designated in turn as (BL2-z).

The basecoat material (bL2-x) may be identical or different. It is also possible to produce two or more basecoat films (BL2-x) with the same basecoat material, and one or more further basecoat films (BL2-x) with one or more other basecoat materials.

If a first basecoat film is produced by applying a first basecoat material and a further basecoat film is produced by applying the same basecoat material, then obviously both films are based on the same basecoat material. But application, obviously, takes place in two stages, meaning that the basecoat material in question, in the sense of the method of the invention, corresponds to a first basecoat material (bL2-a) and a further basecoat material (bL2-z). The system described is also frequently referred to as a one-coat basecoat film system produced in two applications. Since, however, especially in real-life production-line (OEM) finishing, the technical circumstances in a finishing line always dictate a certain time span between the first application and the second application, during which the substrate, the automobile body, for example, is conditioned at 15 to 35° C., for example, and thereby flashed, it is formally clearer to characterize this system as a two-coat basecoat system. The operating regime described should therefore be assigned to the second alternative of step (2).

A number of preferred variants of the basecoat film sequences for the basecoat materials (bL2-x) may be elucidated as follows.

In the context of the present invention it is preferred if two directly successive basecoats (bL2-a) and (bL2-x) are produced on the cured first coat (S1) by applying an aqueous basecoat material (bL2-a) directly to the first coat (S1) and directly subsequently applying a further aqueous basecoat material (bL2-z) directly to the first basecoat (bL2-a). The first basecoat (bL2-a) may be produced, for example, by electrostatic spray application (ESTA) or a pneumatic application of a first basecoat material (bL2-a) directly on the cured first coat (S1) and, as described below, flashed off and/or subjected to interim drying. Subsequently, by direct application of a second basecoat material (bL2-z), which is different from the first basecoat material, a second basecoat (bL2-z) is produced. The second basecoat material here may also be applied by electrostatic spray application or by pneumatic application, thereby producing a second basecoat film (BL2-z) directly on the first basecoat film (BL2-a). Between and/or after the applications it is of course possible to carry out flashing and/or interim drying again. This variant is selected preferably when first of all a color-preparatory basecoat film (BL2-a), as described in more detail later on below, is to be produced directly on the first coat (S1), and then a color- and/or effect-imparting basecoat film (BL2-z), as described in more detail later on below, is to be produced directly on the first basecoat film. The first basecoat film (BL2-a) in that case is based on the color-preparatory basecoat material (bl2-a), the second basecoat film (BL2-z) on the color- and/or effect-imparting basecoat material (bl2-z). It is likewise possible, for example, to apply this second basecoat material as described above in two stages, thereby forming two further, directly successive basecoat films (BL2-b) and (BL2-z), both based on the same basecoat material, directly on the first basecoat film (BL2-a).

It is likewise possible for three basecoat films to be produced in direct succession directly on the cured first coat (S1), with the basecoat films being based on three different basecoat materials. For example, a color-preparatory basecoat film (BL2-a), a further film based on a color- and/or effect-imparting basecoat material (BL2-b), and a further film based on a second color- and/or effect-imparting basecoat material (BL2-z) may be produced. Between and/or after the individual applications and/or after all three applications, it is possible in turn to carry out flashing and/or interim drying.

Embodiments preferred in the context of the present invention therefore comprise the production in alternative 2 of step (2) of the method of the invention of two or three basecoat films. In that case it is preferred for the basecoat film (BL2-a) produced directly on the cured first coat (S1) to be based on a color-preparatory basecoat material (BL2-a). The second and any third film are based either on one and the same color- and/or effect-imparting basecoat material (bL2-b) and (bL2-z), or on a first color- and/or effect-imparting basecoat material (bL2-b) and on a different second color- and/or effect-imparting basecoat material (bL2-z).

The aqueous basecoat materials (bL2a) and (bL2-x) used in step (2) are each curable chemically-thermally, and with more particular preference are externally crosslinking.

The basecoat materials (bL2-a) and (bL2-x) may each be one-component or two-component coating materials. It is preferred in accordance with the invention, however, if the basecoat material (bL2a) or at least one of the basecoat materials (bL2-x), preferably all the basecoat materials (bL2-x), are one-component coating materials. This obviates any mixing of the two components before application of the basecoat materials (bL2a) and (bL2-x), and therefore reduces the workload.

The basecoat materials (bL2a) and (bL2-x) each comprise at least one binder, preferably a mixture of different binders. In the context of the present invention, it is preferable if the binder is selected from the group consisting of polyacrylates, especially aqueous dispersions of anionic polyacrylates, polyurethanes, polyesters, and copolymers of the stated polymers, for example polyurethane polyacrylates.

It is particularly preferred in this context if the aqueous dispersion of anionic polyacrylates (wD-PAC) is obtainable by the successive radical emulsion polymerization of three mixtures (A), (B), and (C) of olefinically unsaturated monomers, where
the mixture (A) comprising at least 50 wt % of vinylaromatic monomers, and a polymer prepared from the mixture (A) possessing a glass transition temperature of 10 to 65° C.,
the mixture (B) comprising at least one polyunsaturated monomer, and a polymer prepared from the mixture (B) possessing a glass transition temperature of −35 to 15° C.,
and
the mixture (C) comprising at least one anionic monomer, and a polymer prepared from the mixture (C) possessing a glass transition temperature of −50 to 15° C.,
and
i. first mixture (A) being polymerized,
ii. then mixture (B) being polymerized in the presence of the polymer prepared under i.,
and
iii. thereafter mixture (C) being polymerized in the presence of the polymer prepared under ii.

The dispersion (wD-PAC) preferably comprises precisely one polymer as described above. The preparation of the polymer encompasses the successive radical emulsion polymerization of three mixtures (A), (B), and (C) of olefinically unsaturated monomers. In terms of time, the stages may take place directly one after another. It is equally possible for the corresponding reaction solution after the end of one stage to be stored for a certain time and/or transferred to a different reaction vessel, and only then for the next stage to take place. The preparation of the specific multistage polymer preferably comprises no further polymerization steps additional to the polymerization of the monomer mixtures (A), (B), and (C).

In the case of radical emulsion polymerization olefinically unsaturated monomers are polymerized in an aqueous medium, using at least one water-soluble initiator, and in the presence of at least one emulsifier. Corresponding water-soluble initiators are known. The at least one water-soluble initiator is preferably selected from the group consisting of potassium, sodium, or ammonium peroxodisulfate, hydrogen peroxide, tert-butyl hydroperoxide, 2,2'-azo-bis(2-amidoisopropane) dihydrochloride, 2,2'-azobis-(N,N'-dimethyleneisobutyramidine) dihydrochloride, 2,2'-azobis(4-cyanopentanoic acid), and mixtures of the aforementioned initiators, such as hydrogen peroxide and sodium persulfate, for example. Further suitable initiators and transition metal catalysts are disclosed, for example, in the laid-open specification WO 2017/088988 A1. The initiators are used preferably in an amount of 0.05 to 20 wt %, preferably 0.05 to 10, more preferably from 0.1 to 5 wt %, based on the total weight of the monomers used in the respective polymerization stage.

An emulsion polymerization takes place within a reaction medium that comprises water as continuous medium and comprises the at least one emulsifier in the form of micelles. The polymerization is initiated by decomposition of the water-soluble initiator in the water. The growing polymer chain enters the emulsifier micelles, and the further polymerization then takes place in the micelles. The at least one emulsifier is used preferably in an amount of 0.1-10 wt %, more preferably 0.1-5 wt %, very preferably 0.1-3 wt %, based in each case on the total weight of the monomers used in the respective polymerization stage. Emulsifiers as well are known in principle. Use may be made of nonionic or ionic emulsifiers, including zwitterionic emulsifiers, and also, optionally, mixtures of the aforementioned emulsifiers, as described in laid-open specification WO 2017/088988 A1, for example.

The emulsion polymerizations are carried out usefully at a temperature of 0 to 160° C., preferably of 15 to 95° C., more preferably of 60 to 95° C. It is preferred here to operate in the absence of oxygen, and preferably under an inert gas atmosphere. The polymerization is generally carried out under atmospheric pressure, although the application of lower pressures or higher pressures is also possible. Particularly if polymerization temperatures are employed which lie above the boiling point under atmospheric pressure of water, of the monomers used and/or of the organic solvents, it is usual to select higher pressures. The individual polymerization stages in the preparation of the specific polymer may be carried out, for example, as what are called "starved feed" polymerizations (also known as "starve feed" or "starve fed" polymerizations). A starved feed polymerization in the sense of the present invention is an emulsion polymerization in which the amount of free olefinically unsaturated monomers in the reaction solution (also called reaction mixture) is minimized throughout the reaction time. This means that the metered addition of the olefinically unsaturated monomers is such that over the entire reaction time the fraction of free monomers in the reaction solution does not exceed 6.0 wt %, preferably 5.0 wt %, more preferably 4.0 wt %, particularly advantageously 3.5 wt %, based in each case on the total amount of the monomers used in the respective polymerization stage.

The concentration of the monomers in the reaction solution here may be determined by gas chromatography, for example, as described in laid-open specification WO 2017/088988 A1. The fraction of the free monomers can be controlled by the interplay of initiator quantity, rate of initiator addition, rate of monomer addition, and through the selection of the monomers.

Not only a slowing-down of metering but also an increase in the initial quantity, and also the premature commencement of addition of the initiator, serve the aim of keeping the concentration of free monomers below the limits stated above.

For the purposes of the present invention it is preferable for the polymerization stages ii. and iii. to be carried out under starved feed conditions. This has the advantage that the formation of new particle nuclei within these two polymerization stages is effectively minimized. Instead, the particles existing after stage i. (and therefore also called seed below) can be grown further in stage ii. by the polymerization of the monomer mixture B (therefore also called core below). It is likewise possible for the particles existing after stage ii. (also below called polymer comprising seed and core) to be grown further in stage iii. through the polymerization of the monomer mixture C (therefore also called shell below), resulting ultimately in a polymer comprising particles containing seed, core, and shell. Stage i. as well can of course also be carried out under starved feed conditions.

The mixtures (A), (B), and (C) are mixtures of olefinically unsaturated monomers, wherein the mixtures (A), (B), and (C) are different from one another. They therefore each contain different monomers and/or different proportions of at least one defined monomer.

Mixture (A) comprises at least 50 wt %, preferably at least 55 wt %, of vinylaromatic compounds. One such preferred monomer is styrene. In addition to the vinylaromatic compounds, the monomer mixture (A) contains no monomers that have functional groups containing heteroatoms. With particular preference, the monomer mixture (A) comprises at least one monounsaturated ester of (meth)acrylic acid with an alkyl radical and at least one monoolefinically unsaturated monomer containing vinyl groups, with a radical arranged on the vinyl group that is aromatic or that is mixed saturated aliphatic-aromatic, in which case the aliphatic fractions of the radical are alkyl groups.

The monomers present in the mixture (A) are selected such that a polymer prepared from them possesses a glass transition temperature of 10 to 65° C., preferably of 30 to 50° C. For a useful estimation of the glass transition temperature to be expected in the measurement, the known Fox equation can be employed. Since the Fox equation represents a good approximation, based on the glass transition temperatures of the homopolymers and their parts by weight, without incorporation of the molecular weight, it can be used as a guide to the skilled person in the synthesis, allowing a desired glass transition temperature to be set via a few goal-directed experiments.

The polymer prepared in stage i. by the emulsion polymerization of the monomer mixture (A) preferably has a particle size of 20 to 125 nm (for the measurement of the particle size see item 3 of the description of the methods).

Mixture (B) comprises at least one polyolefinically unsaturated monomer, preferably at least one diolefinically unsaturated monomer. One such preferred monomer is 1,6-hexanediol diacrylate. Preferably the monomer mixture (B) likewise contains no monomers with functional groups containing heteroatoms. Particularly preferably, the monomer mixture (B), as well as at least one polyolefinically unsaturated monomer, includes in any rate the following further monomers. First of all, at least one monounsaturated ester of (meth)acrylic acid with an alkyl radical, and secondly at least one monoolefinically unsaturated monomer containing vinyl groups and having a radical located on the vinyl group that is aromatic or that is a mixed saturated aliphatic-aromatic radical, in which case the aliphatic fractions of the radical are alkyl groups.

The fraction of polyunsaturated monomers is preferably from 0.05 to 3 mol %, based on the total molar amount of monomers in the monomer mixture (B).

The monomers present in the mixture (B) are selected such that a polymer prepared therefrom possesses a glass transition temperature of −35 to 15° C., preferably of −25 to +7° C.

The polymer which is obtained after stage ii. preferably possesses a particle size of 80 to 280 nm, preferably 120 to 250 nm.

The monomers present in the mixture (C) are selected such that a polymer prepared therefrom possesses a glass transition temperature of −50 to 15° C., preferably of −20 to +12° C.

The olefinically unsaturated monomers of this mixture (C) are preferably selected such that the resulting polymer, comprising seed, core, and shell, has an acid number of 10 to 25. Accordingly, the mixture (C) preferably comprises at least one alpha-beta unsaturated carboxylic acid, especially preferably (meth)acrylic acid.

The olefinically unsaturated monomers of the mixture (C) are further preferably selected such that the resulting polymer, comprising seed, core, and shell, has an OH number of 0 to 30, preferably 10 to 25. All of the aforementioned acid numbers and OH numbers are values calculated on the basis of the monomer mixtures employed overall.

Particularly preferably, the monomer mixture (C) comprises at least one alpha-beta unsaturated carboxylic acid, at least one monounsaturated ester of (meth)acrylic acid having an alkyl radical substituted by a hydroxyl group and at least one monounsaturated ester of (meth)acrylic acid having an alkyl radical.

With particular preference neither the monomer mixture (A) nor the monomer mixtures (B) or (C) comprise a polyurethane polymer which has at least one polymerizable double bond.

Following its preparation, the polymer possesses a particle size of 100 to 500 nm, preferably 125 to 400 nm, very preferably from 130 to 300 nm, and also a glass transition temperature $T_g$ of −20 to −5° C.

The fractions of the monomer mixtures are preferably harmonized with one another as follows. The fraction of the mixture (A) is from 0.1 to 10 wt %, the fraction of the mixture (B) is from 60 to 80 wt %, and the fraction of the mixture (C) is from 10 to 30 wt %, based in each case on the sum of the individual amounts of the mixtures (A), (B), and (C).

An anionic polyacrylate used with particular preference in the aqueous dispersion (wD-PAC) in the context of the present invention is preparable by reacting
- a mixture (A) of 50 to 85 wt % of a vinylaromatic monomer and 15 to 50 wt % of a monounsaturated ester of (meth)acrylic acid with an alkyl radical,
- a mixture (B) of 1 to 4 wt % of a polyolefinically unsaturated monomer, 60 to 80 wt % of a monounsaturated ester of (meth)acrylic acid with an alkyl radical, and 16 to 39 wt % of a vinylaromatic monomer, and
- a mixture (C) of 8 to 15 wt % of an alpha-beta unsaturated carboxylic acid, 10 to 20 wt % of a monounsaturated ester of (meth)acrylic acid with an alkyl radical substituted by a hydroxyl group, and 65 to 82 wt % of monounsaturated esters of (meth)acrylic acid with an alkyl radical, where
i. first the mixture (A) is polymerized,
ii. then the mixture (B) is polymerized in the presence of the polymer prepared under i., and
iii. thereafter the mixture (C) is polymerized in the presence of the polymer prepared under ii.

The above figures in wt % are based in each case on the total weight of the mixture (A) or (B) or (C), respectively.

The aqueous dispersion (wD-PAC) preferably possesses a pH of 5.0 to 9.0, more preferably 7.0 to 8.5, very preferably 7.5 to 8.5. The pH may be kept constant during the preparation itself, through the use of bases as identified further on below, for example, or else may be set deliberately after the polymer has been prepared. The stages i. to iii. described are carried out preferably without addition of acids or bases known for the setting of the pH and the pH is set only after the preparation of the polymer, by addition of organic, nitrogen-containing bases, sodium hydrogencarbonate, borates, and also mixtures of the aforesaid substances.

The solids content of the aqueous dispersion (wD-PAC) is preferably from 15% to 40% and more preferably 20% to 30%.

The aqueous dispersion (wD-PAC) preferably comprises a fraction of 55 to 75 wt %, especially preferably 60 to 70 wt %, based in each case on the total weight of the dispersion, of water. It is further preferred if the percentage sum of the solids content of the dispersion (wD-PAC) and the fraction of water in the dispersion (wD-PAC) is at least 80 wt %, preferably at least 90 wt %. Preferred in turn are ranges from 80 to 99 wt %, especially 90 to 97.5 wt %. In this figure, the solids content, which traditionally only possesses the unit is reported in "weight %". Since the solids content ultimately also represents a percentage weight figure, this form of representation is justified. Where, for example, a dispersion has a solids content of 25% and a water content of 70 wt %, the above-defined percentage sum of the solids content and the fraction of water amounts to 95 wt %, therefore.

The dispersion (wD-PAC) accordingly consists very largely of water and of the specific polymer, and environmentally burdensome components, such as organic solvents in particular, are present only in minor proportions or not at all.

The fraction of the one or more dispersions (wD-PAC), based on the total weight of the aqueous basecoat material (bL2a) or (bL2-x), is preferably 5 to 60 wt %, more preferably 10 to 50 wt %, and very preferably 20 to 45 wt %.

The fraction of the polymers originating from the dispersions (wD-PAC), based on the total weight of the aqueous basecoat material (bL2a) or (bL2-x), is preferably from 1 to 24 wt %, more preferably 2.5 to 20.0 wt % and very preferably 3 to 18.0 wt %.

Determining or specifying the fraction of the polymers originating from the dispersions (wD-PAC) for inventive use in the basecoat material may be done via the determination of the solids content (also called nonvolatile fraction or solids fraction) of a dispersion (wD-PAC) which is to be used in the basecoat material.

In the case of a possible particularization to basecoat materials comprising preferred dispersions (wD-PAC) in a specific proportional range, the following applies.

The dispersions (wD-PAC) which do not fall within the preferred group may of course still be present in the basecoat material. In that case the specific proportional range applies only to the preferred group of dispersions (wD-PAC). It is preferred nonetheless for the total proportion of dispersions (wD-PAC), consisting of dispersions from the preferred group and dispersions which are not part of the preferred group, to be subject likewise to the specific proportional range.

In the case of a restriction to a proportional range of 10 to 50 wt % and to a preferred group of dispersions (wD-PAC), therefore, this proportional range evidently applies initially only to the preferred group of dispersions (wD-PAC). In that case, however, it would be preferable for there to be likewise from 10 to 50 wt % in total present of all originally encompassed dispersions, consisting of dispersions from the preferred group and dispersions which do not form part of the preferred group. If, therefore, 35 wt % of dispersions (wD-PAC) of the preferred group are used, not more than 15 wt % of the dispersions of the non-preferred group may be used.

The stated principle is valid, for the purposes of the present invention, for all stated components of the basecoat material and for their proportional ranges—for example, for the pigments specified later on below, or else for the crosslinking agents specified later on below, such as melamine resins.

The aqueous basecoat materials (bL2a) and (bL2-x), in particular all basecoat materials (bL2-x), preferably each further comprise at least one polymer as binder that is different from the anionic polyacrylate present in the dispersion (wD-PAC), more particularly at least one polymer selected from the group consisting of polyurethanes, polyesters, polyacrylates and/or copolymers of the stated polymers, more particularly polyesters and/or polyurethane polyacrylates. Preferred polyesters are described, for example, in DE 4009858 A1 in column 6, line 53 to column 7, line 61 and column 10, line 24 to column 13, line 3, or WO 2014/033135 A2, page 2, line 24 to page 7, line 10 and page 28, line 13 to page 29, line 13. Preferred polyurethane-polyacrylate copolymers (acrylated polyurethanes) and their preparation are described in, for example, WO 91/15528 A1, page 3, line 21 to page 20, line 33, and DE 4437535 A1, page 2, line 27 to page 6, line 22. The described polymers as binders are preferably hydroxy-functional and especially preferably possess an OH number in the range from 15 to 200 mg KOH/g, more preferably from 20 to 150 mg KOH/g. The basecoat materials more preferably comprise at least one hydroxy-functional polyurethane-polyacrylate copolymer, more preferably still at least one hydroxy-functional polyurethane-polyacrylate copolymer and also at least one hydroxy-functional polyester.

The proportion of the further polymers as binders may vary widely and is situated preferably in the range from 1.0 to 25.0 wt %, more preferably 3.0 to 20.0 wt %, very preferably 5.0 to 15.0 wt %, based in each case on the total weight of the basecoat material (bL2a) or (bL2-x).

The basecoat materials (b2La) and (bL2-x), more particularly all basecoat materials (bL2-x) for use in accordance with the invention preferably each comprise at least one pigment. Reference here is to conventional pigments imparting color and/or optical effect.

Such color pigments and effect pigments are known to those skilled in the art and are described, for example, in Rompp-Lexikon Lacke and Druckfarben, Georg Thieme Verlag, Stuttgart, New York, 1998, pages 176 and 451. The terms "coloring pigment" and "color pigment" are interchangeable, just like the terms "optical effect pigment" and "effect pigment".

Preferred effect pigments are, for example, platelet-shaped metal effect pigments such as lamellar aluminum pigments, gold bronzes, oxidized bronzes and/or iron oxide-aluminum pigments, pearlescent pigments such as pearl essence, basic lead carbonate, bismuth oxide chloride and/or metal oxide-mica pigments and/or other effect pigments such as lamellar graphite, lamellar iron oxide, multilayer effect pigments composed of PVD films and/or liquid crystal polymer pigments. Particularly preferred are lamellar metal effect pigments, more particularly lamellar aluminum pigments.

Typical color pigments especially include inorganic coloring pigments such as white pigments such as titanium dioxide, zinc white, zinc sulfide or lithopone; black pigments such as carbon black, iron manganese black, or spinel black; chromatic pigments such as chromium oxide, chromium oxide hydrate green, cobalt green or ultramarine green, cobalt blue, ultramarine blue or manganese blue, ultramarine violet or cobalt violet and manganese violet, red iron oxide, cadmium sulfoselenide, molybdate red or ultramarine red; brown iron oxide, mixed brown, spinel phases and corundum phases or chromium orange; or yellow iron oxide, nickel titanium yellow, chromium titanium yellow, cadmium sulfide, cadmium zinc sulfide, chromium yellow or bismuth vanadate.

The fraction of the pigments is preferably situated in the range from 1.0 to 40.0 wt %, preferably 2.0 to 35.0 wt %, more preferably 5.0 to 30.0 wt %, based on the total weight of the aqueous basecoat material (bL2a) or (bL2-x) in each case.

The basecoat materials (bL2a) and (bL2-x), more particularly all basecoat materials (bL2-x), may in each case further comprise at least one typical crosslinking agent known per se. If the basecoat materials comprise a crosslinking agent, said agent comprises preferably at least one aminoplast resin and/or at least one blocked polyisocyanate, preferably an aminoplast resin. Among the aminoplast resins, melamine resins in particular are preferred. In the context of the present invention, therefore, it is preferred if the basecoat material (bL2a) or at least one of the basecoat materials (bL2-x), preferably all of the basecoat materials (bL2-x), comprises at least one melamine resin as crosslinking agent.

If the basecoat materials (bL2a) and (bL2-x) comprise crosslinking agents, the proportion of these crosslinking agents, more particularly aminoplast resins and/or blocked polyisocyanates, very preferably aminoplast resins and, of these, preferably melamine resins, is preferably in the range from 0.5 to 20.0 wt %, more preferably 1.0 to 15.0 wt %, very preferably 1.5 to 10.0 wt %, based in each case on the total weight of the basecoat material (bL2a) or (bL2-x).

The basecoat materials (bL2a) and (bL2-x), more particularly all basecoat materials (bL2-x), may further each comprise at least one thickener. Suitable thickeners are inorganic thickeners from the group of the phyllosilicates such as lithium aluminum magnesium silicates. Likewise, the basecoat material may preferably comprise at least one organic thickener, as for example a (meth)acrylic acid-(meth)acrylate copolymer thickener or a polyurethane thickener. Employed for example here may be conventional organic associative thickeners, such as the known associative polyurethane thickeners, for example. Associative thickeners, as is known, are termed water-soluble polymers which have strongly hydrophobic groups at the chain ends or in side chains, and/or whose hydrophilic chains contain hydrophobic blocks or concentrations in their interior. As a result, these polymers possess a surfactant character and are capable of forming micelles in aqueous phase. In similarity with the surfactants, the hydrophilic regions remain in the aqueous phase, while the hydrophobic regions enter into the particles of polymer dispersions, adsorb on the surface of other solid particles such as pigments and/or fillers, and/or form micelles in the aqueous phase. Ultimately a thickening effect is achieved, without any increase in sedimentation behavior.

Thickeners as stated are available commercially. The proportion of the thickeners is preferably in the range from 0.1 to 5.0 wt %, more preferably 0.2 to 3.0 wt %, very preferably 0.3 to 2.0 wt %, based in each case on the total weight of the basecoat material (bL2a) or (bL2-x).

Furthermore, the basecoat materials (bL2a) and (bL2-x), more particularly all basecoat materials (bL2-x), may further each comprise at least one further adjuvant. Examples of such adjuvants are salts which are thermally decomposable without residue or substantially without residue, polymers as binders that are curable physically, thermally and/or with actinic radiation and that are different from the polymers already stated as binders, further crosslinking agents, organic solvents, reactive diluents, transparent pigments, fillers, molecularly dispersely soluble dyes, nanoparticles, light stabilizers, antioxidants, deaerating agents, emulsifiers, slip additives, polymerization inhibitors, initiators of radical polymerizations, adhesion promoters, flow control agents, film-forming assistants, sag control agents (SCAs), flame retardants, corrosion inhibitors, waxes, siccatives, biocides, and matting agents. Such adjuvants are used in the customary and known amounts.

The solids content of the basecoat materials (bL2a) and (bL2-x) may each vary according to the requirements of the case in hand. The solids content is guided primarily by the viscosity that is needed for application, more particularly spray application. A particular advantage is that the basecoat materials for inventive use, for comparatively high solids contents, is able nevertheless to have a viscosity which allows appropriate application.

The solids content of the basecoat materials (bL2a) and (bL2-x) is preferably in each case at least 16.5%, more preferably at least 18.0%, even more preferably at least 20.0%.

Under the stated conditions, in other words at the stated solids contents, preferred basecoat materials (bL2a) and (bL2-x) each have a viscosity of 40 to 150 mPa·s, more particularly of 70 to 120 mPa·s, at 23° C. under a shearing load of 1000 1/s (for further details regarding the measurement method, see Examples section). For the purposes of the present invention, a viscosity within this range under the stated shearing load is referred to as spray viscosity (working viscosity). As is known, coating materials are adjusted to spray viscosity, meaning that under the conditions then present (high shearing load) they possess a viscosity which in particular is not too high, so as to permit effective application. This means that the setting of the spray viscosity is important, in order to allow a paint to be applied at all by spray methods, and to ensure that a complete, uniform coating film is able to form on the substrate to be coated.

The basecoat materials (bL2a) and (bL2-x) for inventive use are in each case aqueous. The fraction of water in the basecoat materials (bL2a) and (bL2-x) is in each case preferably from 35 to 70 wt %, and more preferably 45 to 65 wt %, based in each case on the total weight of the basecoat material (bL2a) or (bL2-x).

Even more preferred is for the percentage sum of the solids content of the basecoat material (bL2a) or (bL2-x) and the fraction of water in the basecoat material (bL2a) or (bL2-x) to be at least 70 wt %, preferably at least 75 wt %. Among these figures, preference is given to ranges of 75 to 95 wt %, in particular 80 to 90 wt %. This means in particular that preferred basecoat materials (bL2a) and (bL2-x) comprise components that are in principle a burden on the environment, such as organic solvents in particular, in relation to the solids content of the basecoat material, at only low fractions. The ratio of the volatile organic fraction of the basecoat material (bL2a) or (bL2-x) (in wt %) to the solids content of the basecoat material (bL2a) or (bL2-x) (in analogy to the representation above, here in wt %) is preferably from 0.05 to 0.7, more preferably from 0.15 to 0.6. In the context of the present invention, the volatile organic fraction is considered to be that fraction of the basecoat material (bL2a) or (bL2-x) that is considered neither part of the water fraction nor part of the solids content.

Another advantage of the basecoat materials (bL2a) and (bL2-x) is that they can be prepared without the use of eco-unfriendly and health-injurious organic solvents such as N-methyl-2-pyrrolidone, dimethylformamide, dioxane, tetrahydrofuran, and N-ethyl-2-pyrrolidone. Accordingly, the basecoat materials (bL2a) and (bL2-x) preferably contain less than 10 wt %, more preferably less than 5 wt %, more preferably still less than 2.5 wt % of organic solvents selected from the group consisting of N-methyl-2-pyrrolidone, dimethylformamide, dioxane, tetrahydrofuran, and N-ethyl-2-pyrrolidone. The basecoat materials (bL2a) and (bL2-x) are preferably entirely free from these organic solvents.

The basecoat materials (bL2a) and (bL2-x) can be produced using the mixing assemblies and mixing techniques that are customary and known for the production of basecoat materials.

In the preferred alternative 2 of step (2) of the method of the invention, described earlier on above, a first basecoat material (bL2-a) is first of all applied, and may also be termed a color-preparatory basecoat material. It therefore serves as a base for at least one color and/or effect basecoat film that then follows, this being a film which is then able optimally to fulfill its function of imparting color and/or effect.

In one particular embodiment, a color-preparatory basecoat material (bL2-a) is substantially free from chromatic pigments and effect pigments. More particularly preferably a basecoat material of this kind contains less than 2 wt %, preferably less than 1 wt %, of chromatic pigments and effect pigments, based in each case on the total weight of the aqueous basecoat material (bL2-a). In this embodiment the color-preparatory basecoat material (bL2-a) preferably comprises black and/or white pigments, especially preferably both kinds of these pigments. It comprises preferably 5 to 30 wt %, preferably 10 to 25 wt %, of white pigments, and 0.01 to 1.00 wt %, preferably 0.1 to 0.5 wt %, of black pigments, based in each case on the total weight of the basecoat material (bL2-a). The resultant white, black, and more particularly gray color, which can be adjusted in different lightness stages through the ratio of white pigments and black pigments, represents an individually adaptable basis for the basecoat film system that then follows, allowing the color and/or the effect imparted by the subsequent basecoat system to be manifested optimally.

The pigments are known to the skilled person and have also been described earlier on above. A preferred white pigment here is titanium dioxide, a preferred black pigment carbon black. As already described, however, this basecoat material (bL2-a) may of course also comprise chromatic and/or effect pigments. This variant is appropriate especially when the resultant multicoat paint system is to have a highly chromatic hue, as for example a very deep red or yellow. Where pigments in appropriately chromatic hue are also added to the color-preparatory basecoat material, a further improved coloration can be achieved.

The color and/or effect basecoat material(s) (bL2-b) and (bL2-z) for the second basecoat film or for the second and third basecoat films within this embodiment are adapted in accordance with the ultimately desired coloration of the overall system. Where the desire is for a white, black, or gray color, the at least one further basecoat material (bL2-b) or (bL2-z) comprises the corresponding pigments and in terms of the pigment composition ultimately resembles the color-preparatory basecoat material. Where the desire is for a chromatic and/or effect paint system, as for example a chromatic solid-color paint system or a metallic-effect paint system, corresponding chromatic and/or effect pigments are used in amounts of, for example, 1 to 15 wt %, preferably 3 to 10 wt %, based in each case on the total weight of the basecoat material (bL2-b) or (bL2-z). Chromatic pigments belong to the group of color pigments, the latter also encompassing achromatic color pigments such as black or white pigments. Basecoat materials of this kind may of course also include black and/or white pigments as well for the purpose of lightness adaptation.

The basecoats (BL2a) and (BL2-x) are not cured within step (2) of the method of the invention, meaning that they are preferably not exposed to temperatures of above 100° C. for a duration of longer than 1 minute, and with particular preference are not exposed at all to temperatures of more than 100° C. This is evident, directly and unambiguously, from step (4) of the method of the invention, which is described later on below. Because the basecoats are not cured until step (4), they cannot be already cured in step (2), since in that case the curing in step (4) would no longer be possible.

The basecoat materials (bL2a) and (bL2-x) are applied such that the basecoat (BL2a) and the individual basecoats (BL2-x), after the curing which has taken place in step (4), each have a film thickness of, for example, 5 to 50 micrometers, preferably 6 to 40 micrometers, especially preferably 7 to 35 micrometers. In the first alternative of step (2), basecoats (BL2a) with higher film thicknesses of 15 to 50 micrometers, preferably 20 to 45 micrometers, are preferably produced. In the case of the second alternative of step (2), the individual basecoats (BL2-x) tend to have lower film thicknesses by comparison, with the overall system then again having film thicknesses which lie within the order of magnitude of one basecoat (BL2a). In the case of two basecoats, for example, the first basecoat (BL2-a) has film thicknesses preferably of 5 to 35 micrometers, more particularly 10 to 30 micrometers, and the second basecoat (BL2-z) preferably has film thicknesses of 5 to 35 micrometers, more particularly 10 to 30 micrometers, with the overall film thickness not exceeding 50 micrometers.

Prior to application of the basecoat material (bL2a) or (bL2-x), it is mixed in accordance with the invention with at least one aqueous dispersion. According to a first alternative A1 of the method of the invention, the aqueous dispersion (D1) comprises a polyamide (PA) having an acid number of 15 to 60 mg KOH/g, based on the solids content of the dispersion (D1). A second alternative A2 uses an aqueous dispersion (D2) comprising at least one polyamide (PA) and at least one amide wax (AW). In this case it is particularly preferred if the aqueous dispersion (D1) or (D2) can be mixed homogeneously with the basecoat material (bL2a) or (bL2-x), since only this ensures that the sag resistance achieved is sufficient and therefore that slumping is prevented. Homogenous mixing in accordance with the invention means that, after addition of the aqueous dispersion (D1) or (D2) to the basecoat material (bL2a) or (bL2-x) and also after laminar mixing, on a macroscopic scale a one-phase mixture is obtained.

In the context of the present invention it has proven advantageous if certain polyamides (PA) are present in the aqueous dispersion (D1) or (D2). Advantageously in accordance with the invention, below-specified polyamides (PA) are present both in the dispersion (D1) and in the dispersion (D2). In preferred embodiments of the present invention, therefore, the aqueous dispersion (D1) and (D2) comprises at least one polyamide (PA), the at least one polyamide (PA) being a product of reaction of a diamine having 2 to 34 carbon atoms and a molar excess, based on the diamine, of a dicarboxylic acid having 4 to 36 carbon atoms, preferably 6 to 36 carbon atoms, or of a mixture of a dicarboxylic acid having 4 to 36 carbon atoms, preferably 6 to 36 carbon atoms, and a monocarboxylic acid having 2 to 22 carbon atoms, preferably 12 to 18 carbon atoms.

Suitable diamines having 2 to 34 carbon atoms are selected for example from the group of ethylenediamine, 1,4-diaminobutane, hexamethylenediamine, meta-xylylenediamine, 1,10-decamethylenediamine, 1,11-undecamethylenediamine, 1,12-dodecamethylenediamine, 4,4'-diaminodiphenylmethane, dimer diamine, and mixtures thereof. Particularly preferred for use in preparing the polyamide (PA) are ethylenediamine, hexamethylenediamine, 1,12-dodecamethylenediamine, 4,4'-diaminodiphenylmethane, and dimer diamine. Dimer diamines are obtained by reacting dimer fatty acids having not more than 34 carbon atoms with ammonia and then hydrogenating the resultant nitrile groups to form amine groups.

Dimer fatty acids (for a long time also known as dimerized fatty acids or dimer acids), generally and especially in the context of the present invention, are mixtures which are prepared by oligomerization of unsaturated fatty acids. They are preparable, for example, by catalytic dimerization of unsaturated fatty acids of plant origin, with unsaturated $C_{12}$ to $C_{22}$ fatty acids especially being used as starting materials. Linkage proceeds primarily according to the Diels-Alder type, to result, according to the number and position of the double bonds in the fatty acids used for preparing the dimer fatty acids, in mixtures of primarily dimeric products which have cycloaliphatic, linear-aliphatic, branched aliphatic, and also C6-aromatic hydrocarbon groups between the carboxyl groups. Depending on mechanism and/or optional subsequent hydrogenation, the aliphatic radicals may be saturated or unsaturated and the fraction of aromatic groups as well may vary. The radicals between the carboxylic groups then contain 24 to 44 carbon atoms, for example. Preference is given, for the preparation, to using fatty acids having 18 carbon atoms, meaning that the dimeric product thus has 36 carbon atoms. The radicals which connect the carboxyl groups of the dimer fatty acids preferably have no unsaturated bonds and no aromatic hydrocarbon radicals.

Depending on the reaction regime, the above-identified oligomerization produces mixtures which comprise primarily dimeric but also trimeric molecules and also monomeric molecules and other byproducts. Purification is typically by distillative means. Commercial dimer fatty acids generally contain at least 80 wt % of dimeric molecules, up to 19 wt % of trimeric molecules, and not more than 1 wt % of monomeric molecules and other byproducts.

Dimer fatty acids used with preference are those consisting to an extent of at least 90 wt %, preferably at least 95 wt %, very particularly preferably at least 98 wt %, of dimeric fatty acid molecules.

In the sense of the present invention it is preferred to use dimer fatty acids which consist to an extent of at least 90 wt % of dimeric molecules, less than 5 wt % of trimeric molecules, and less than 5 wt % of monomeric molecules and other byproducts. It is particularly preferred to use dimer fatty acids which consist to an extent of 95 to 98 wt % of dimeric molecules, less than 5 wt % of trimeric molecules, and less than 1 wt % of monomeric molecules and other byproducts. Likewise used with particular preference are dimer fatty acids which consist to an extent of at least 98 wt % of dimeric molecules, less than 1.5 wt % of trimeric molecules, and less than 0.5 wt % of monomeric molecules and other byproducts. The fractions of monomeric, dimeric, and trimeric molecules and also of other byproducts in the dimer fatty acids may be determined, for example, by gas chromatography (GC). In this case, before the GC analysis, the dimer fatty acids are converted into the corresponding methyl esters by the boron trifluoride method (compare DIN EN ISO 5509) and are then analyzed by GC.

The dimer fatty acids for use can be obtained as commercial products. Examples include Radiacid 0970, Radiacid 0971, Radiacid 0972, Radiacid 0975, Radiacid 0976, and Radiacid 0977 from Oleon, Pripol 1006, Pripol 1009, Pripol 1012, and Pripol 1013 from Croda, Empol 1008, Empol 1061, and Empol 1062 from BASF, and Unidyme 10 and Unidyme TI from Arizona Chemical.

Suitable dicarboxylic acids having 4 to 36 carbon atoms are selected from the group of succinic acid, glutaric acid, adipic acid, pimelic acid, suberic acid, azelaic acid, sebacic acid, dodecanedioic acid, isophthalic acid, dimer fatty acids, and mixtures thereof. Particularly preferred for use in preparing the polyamide (PA) are adipic acid, azelaic acid, sebacic acid, and dimer fatty acids.

Suitable monocarboxylic acids having 2 to 22 carbon atoms are preferably selected from the group of acetic acid, propionic acid, butyric acid, pentanoic acid, caproic acid, enanthic acid, caprylic acid, pelargonic acid, capric acid, lauric acid, myristic acid, palmitic acid, stearic acid, 12-hydroxystearic acid, oleic acid, behenic acid, and mixtures thereof. Particularly preferred for use in preparing the polyamide (PA) are capric acid, 12-hydroxystearic acid, and lauric acid.

In aqueous dispersions (D1) and (D2) that are used with particular preference, therefore, the at least one polyamide (PA) is a product of reaction of a diamine having 2 to 34 carbon atoms, more particularly ethylenediamine, hexamethylenediamine, 1,12-dodecamethylenediamine, 4,4'-diaminodiphenylmethane, and dimer diamine, and a molar excess, based on the diamine, of a dicarboxylic acid having 4 to 36 carbon atoms, preferably 6 to 36 carbon atoms, more particularly adipic acid, azelaic acid, sebacic acid, and dimer fatty acids, and/or of a monocarboxylic acid having 2 to 22 carbon atoms, preferably 12 to 18 carbon atoms, more particularly capric acid, 12-hydroxystearic acid, and lauric acid.

The addition of aqueous dispersions (D1) or (D2) which comprise the preferred polyamides (PA) results in particularly effective avoidance of the slumping of the aqueous basecoat material (bL2a) or (bL2-x) from the underlying coat.

According to the first alternative A1 of the present invention, the polyamide (PA) used has an acid number of 15 to 60 mg KOH/g. With particular preference in the context of the present invention, the polyamide (PA) has an acid number of 20 to 50 mg KOH/g. The skilled person is aware of the methods for determining the acid number. The acid number is preferably determined according to DIN EN ISO 2114 (date: June 2002). The acid number of the polyamides (PA) may be controlled and adjusted in particular by contacting and reacting the polyamide (PA) obtained after the reaction with at least one neutralizing agent, preferably via the amount of the neutralizing agent used. Surprisingly, it has emerged that only the use of aqueous dispersions (D1) which comprise polyamides (PA) having an acid number of greater than 15 mg KOH/g leads to prevention of the slumping of the basecoat material (bL2a) or (bL2-x) from the underlying coat. Aqueous dispersions which comprise polyamides (PA) having an acid number of less than 15 mg KOH/g, conversely, cannot be incorporated homogeneously into the aqueous basecoat materials (bL2a) and (bL2-x) and therefore also do not lead to prevention of the slumping.

Dispersions (D1) and (D2) preferred in the context of the present invention comprise neutralized polyamides (PA). It is therefore advantageous in accordance with the invention if the polyamide (PA) is neutralized to an extent of 80% to 100% with a base, preferably with N,N-dimethylethanolamine or triethylamine.

Particular preference is given to using aqueous dispersions (D1) which have a defined polyamide (PA) solids content. In preferred embodiments of the first alternative A1, the aqueous dispersion (D1) has a solids content of 21 to 25 wt %, based on the total weight of the aqueous dispersion (D1). Surprisingly it has emerged that only the use of aqueous dispersions (D1) having the above-stated solids contents results in prevention of the slumping of the basecoat material (bL2a) or (bL2-x) from the underlying coat. Aqueous dispersions with lower solids content, conversely, cannot be incorporated homogeneously into the aqueous basecoat materials (bL2a) and (bL2-x) and therefore also do not result in prevention of the slumping.

Methods for producing the polyamide (PA), especially the above-preferred polyamides (PA), are known to the skilled person. Hence the polyamides (PA) may be obtained by reacting the diamine with an excess of dicarboxylic acid and/or monocarboxylic acid at temperatures of 150 to 200° C. for a period of 2 to 10 hours. If necessary, azeotropic solvents, such as xylene, for example, may be used.

According to a second alternative A2, the aqueous dispersion (D2) comprises not only at least one polyamide (PA), more particularly the above-stated specific polyamides (PA), but also at least one amide wax (AW). Advantageously, particular amide waxes (AW) are present in accordance with the invention. It is therefore preferred in accordance with the invention if the aqueous dispersion (D2) comprises at least one amide wax (AW), the amide wax (AW) being a product of reaction of
  a monocarboxylic acid having 2 to 22 carbon atoms, preferably 12 to 18 carbon atoms, and
  a diamine having 2 to 12 carbon atoms, preferably 2 to 8 carbon atoms, and/or a monoamine having 2 to 22 carbon atoms, preferably 2 to 16 carbon atoms.

Suitable monocarboxylic acids having 2 to 22 carbon atoms are preferably the monocarboxylic acids described above in connection with the polyamide (PA). Particular preference is given to using 12-hydroxystearic acid, stearic acid, palmitic acid, and lauric acid.

Suitable diamines having 2 to 12 carbon atoms are selected for example, from the group of ethylenediamine, 1,4-diaminobutane, hexamethylenediamine, meta-xylylenediamine, 1,10-decamethylenediamine, 1,11-undecamethylenediamine, 1,12-dodecamethylenediamine, and mixtures thereof. Particularly suitable diamines are meta-xylylenediamine, ethylenediamine, and hexamethylenediamine. Suitable monoamines having 2 to 22 carbon atoms are selected from the group of ethylamine, monoethanolamine, propylamine, butylamine, pentylamine, hexylamine, octylamine, decylamine, laurylamine, myristylamine, cetylamine, stearylamine, behenylamine, and mixtures thereof. Particularly preferred for use are cetylamine and also monoethanolamine.

In aqueous dispersions (D2) used with particular preference, therefore, the at least one amide wax (AW) is a product of reaction of
  a monocarboxylic acid having 2 to 22 carbon atoms, preferably 12 to 18 carbon atoms, especially 12-hydroxystearic acid, stearic acid, palmitic acid, and lauric acid, and
  a diamine having 2 to 12 carbon atoms, preferably 2 to 8 carbon atoms, especially meta-xylylenediamine, ethylenediamine, and hexamethylenediamine, and/or a monoamine having 2 to 22 carbon atoms, preferably 2 to 16 carbon atoms, especially cetylamine and also monoethanolamine.

Processes for preparing the amide wax (AW), especially the above-preferred amide waxes (AW), are known to the skilled person. Hence the amide waxes (AW) may be obtained by reaction of the monocarboxylic acid with a diamine and/or monoamine at temperatures of 150 to 200° C. for a period of 2 to 10 hours. If necessary, azeotropic solvents, such as xylene, for example, may be used.

It is preferred in accordance with the invention, moreover, if in the aqueous dispersions (D2) the polyamide (PA) and the amide wax (AW) are used in a particular weight ratio. In preferred embodiments of the present invention, therefore, the aqueous dispersion (D2) has a weight ratio of polyamide (PA) to amide wax (AW) of 95:5 to 40:60, preferably of 80:20 to 45:55. The addition of aqueous dispersions (D2) which comprise the above-recited weight ratios of polyamide (PA) to amide wax (AW) results in particularly effective prevention of the slumping of the aqueous basecoat material (bL2a) or (bL2-x) from the underlying coat.

To produce the aqueous dispersion (D1) or (D2), the neutralized polyamine (PA) or the mixture of neutralized polyamide (PA) and amide wax (AW) is dispersed in water. To facilitate dispersal, the water may include small amounts of organic solvent, such as aliphatic, alicyclic, and aromatic hydrocarbons, ketones, esters, alcohols, and ethers. Moreover, monocarboxylic acids having 2 to 22 carbon atoms, such as, for example, acetic acid, propionic acid, butyric acid, pentanoic acid, caproic acid, enanthic acid, caprylic acid, pelargonic acid, capric acid, lauric acid, myristic acid, palmitic acid, stearic acid, 12-hydroxystearic acid, oleic acid, behenic acid, and also mixtures thereof, may be present. Moreover, nonionic surfactants, such as polyoxyalkylene alkyl ethers, polyoxyethylene alkylaryl ethers, sorbitan fatty acid esters, polyoxyethylene-sorbitan fatty acid esters, polyoxyethylene-oxypropylene copolymers, and hydrogenated castor oil and/or anionic surfactants, such as alkyl fatty acid salts, alkyl sulfate ester salts, polyoxyethylene alkyl ether sulfates, alkylbenzenesulfonic salts, sulfosuccinates, and phosphoric esters, may be used in order to facilitate the dispersing of the polyamide (PA) or of the mixture of polyamide (PA) and amide wax (AW) in water.

The production of the aqueous dispersion (D1) or (D2) of the polyamide (PA) or of the mixture of the polyamide (PA) and amide wax (AW) may be accomplished by adding a neutralized solution of the polyamide (PA) or of the mixture of neutralized polyamide (PA) and amide wax (AW) in organic solvent to a heated solution of water and optionally surfactant. The aqueous solution has temperatures preferably of 30 to 80° C. Furthermore, consideration may be given to heating the prepared aqueous dispersion (D1) or (D2) at 70 to 90° C. over a period of 20 to 24 hours.

The aqueous dispersion (D1) or (D2) is preferably in each case used in a total amount of 0.05 to 1.0 wt %, based on the solids content of the basecoat material (bL2a) or (bL2-x). The use of the amounts recited above permits effective prevention of slumping, but without adversely affecting the high-shear and low-shear viscosity of the basecoat materials.

According to one particularly preferred embodiment of the present invention, the aqueous dispersion (D1) or (D2) is added to a particular basecoat material. It is therefore particularly advantageous in accordance with the invention if the aqueous dispersion (D1) or (D2) is added to the basecoat material (bL2a) or (bL2-a) which is applied directly to the first coat (S1). As observed above, this basecoat material has a higher film thickness, since in this way the primer coat is replaced. As a result of the higher film thickness, this basecoat (BL2a) or (BL2-a) still contains high quantities of residual moisture after being flashed off. Following application of the wet clearcoat material (k) or of a further basecoat material (bL2-b) or (bL2-z), it may be the case that the first basecoat (BL2a) or (BL2-a) is partially dissolved and slumps from the substrate (S). The addition of the aqueous dispersion (D1) or (D2) to the first basecoat material (bL2a) or (bL2-a) reliably prevents the slumping of this basecoat material, even at high film thicknesses and also on wet application of the further coats.

In accordance with the invention, the aqueous dispersion (D1) or (D2) is added to a basecoat material (BL2a) or (BL2-x) directly during the production of the multicoat paint system and immediately before application of the corresponding basecoat material. To avoid unnecessary addition of the dispersion (D1) or (D2), however, it is preferred in accordance with the invention if this dispersion is added to the basecoat material only after slumping has occurred within the method for producing multicoat paint systems. In one particularly preferred embodiment of the present invention, therefore, the aqueous dispersion (D1) or (D2) is added after the establishment of the slumping of the basecoat (BL2) or of at least one of the basecoats (BL2-x), with the aqueous dispersion (D1) or (D2) being added to that basecoat material (bL2a) or at least one of the basecoat materials (bL2-x) which has slumped from the underlying coat. Through the postadditization of the basecoat materials (bL2a) or (bL2-x) during the production of the multicoat paint system, slumping effects that occur can be eliminated reliably and inexpensively, but without adversely affecting the viscosities of the basecoat materials (bL2a) and (bL2-x) and also the mechanical and optical properties of the resultant multicoat paint system.

Step (3):

In step (3) of the method of the invention, a clearcoat film (K) is produced directly on the basecoat film (BL2a) or on the topmost basecoat film (BL2-z). This production is accomplished by corresponding application of a clearcoat material (k).

The clearcoat material (k) may be any desired transparent coating material known in this sense to the skilled person. "Transparent" means that a film formed with the coating material is not opaquely colored, but instead has a constitution such that the color of the underlying basecoat system is visible. As is known, however, this does not rule out the possible inclusion, in minor amounts, of pigments in a clearcoat material, such pigments possibly supporting the depth of color of the overall system, for example.

The coating materials in question are aqueous or solvent-containing transparent coating materials, which may be formulated not only as one-component but also as two-component or multicomponent coating materials. Also suitable, furthermore, are powder slurry clearcoat materials. Solventborne clearcoat materials are preferred.

The clearcoat materials (k) used may in particular be thermochemically curable and/or actinic-chemically curable. In particular they are thermochemically curable and externally crosslinking.

Typically and preferably, therefore, the clearcoat materials comprise at least one (first) polymer as binder, having functional groups, and at least one crosslinker having a functionality complementary to the functional groups of the binder. With preference at least one hydroxy-functional poly(meth)acrylate polymer is used as binder, and a free polyisocyanate as crosslinking agent.

Suitable clearcoat materials are described in, for example, WO 2006042585 A1, WO 2009077182 A1, or else WO 2008074490 A1.

The clearcoat material (k) is applied by the methods known to the skilled person for applying liquid coating materials, as for example by dipping, knifecoating, spraying, rolling, or the like. Preference is given to employing spray application methods, such as, for example, compressed air spraying (pneumatic application), and electrostatic spray application (ESTA).

The clearcoat material (k) or the corresponding clearcoat film (K) is subjected to flashing and/or interim-drying after application, preferably at 15 to 35° C. for a duration of 0.5 to 30 minutes. These flashing and interim-drying conditions apply in particular to the preferred case where the clearcoat material (k) comprises a thermochemically curable two-component coating material. But this does not rule out the clearcoat material (k) being an otherwise-curable coating material and/or other flashing and/or interim-drying conditions being used.

The clearcoat material (k) is applied in such a way that the clearcoat film after the curing has taken place in step (4) has a film thickness of, for example, 15 to 80 micrometers, preferably 20 to 65 micrometers, especially preferably 25 to 60 micrometers.

In the method of the invention, of course, there is no exclusion of further coating materials, as for example further clearcoat materials, being applied after the application of the clearcoat material (k), and of further coating films, as for example further clearcoat films, being produced in this way. Such further coating films are then likewise cured in the stage (4) described below. Preferably, however, only the one clearcoat material (k) is applied, and is then cured as described in step (4).

Step (4):

In step (4) of the method of the invention there is joint curing of the basecoat film (BL2a) and of the clearcoat film (K) or of the basecoat films (BL2-x) and of the clearcoat film (K).

The joint curing takes place preferably at temperatures of 100 to 250° C., preferably 100 to 180° C., for a duration of 5 to 60 minutes, preferably 10 to 45 minutes. These curing conditions apply in particular to the preferred case wherein the basecoat film (BL2a) or at least one of the basecoat films (BL2-x), preferably all basecoat films (BL2-x), are based on a thermochemically curable one-component coating material. The reason is that, as described above, such conditions are generally required to achieve curing as described above for a one-component coating material of this kind. Where the clearcoat material (k), for example, is likewise a thermochemically curable one-component coating material, the corresponding clearcoat film (K) is of course likewise cured under these conditions. The same is evidently true of the preferred case wherein the clearcoat material (k) is a thermochemically curable two-component coating material.

The statements made above, however, do not rule out the basecoat materials (bL2a) and (bL2-x) and also the clearcoat materials (k) being otherwise-curable coating materials and/or other curing conditions being used.

The result after the end of step (4) of the method of the invention is a multicoat paint system of the invention.

The method of the invention allows multicoat paint systems to be produced on substrates without a separate curing step. Nevertheless, application of the method of the invention results in multicoat paint systems which exhibit excellent stability toward pinholes, meaning that even relatively high film thicknesses of the corresponding basecoat films can be built up without loss of esthetic quality. Furthermore, with the method of the invention, the incidence of slumping can be effectively eliminated, but without negatively impacting the mechanical or optical properties of the multicoat paint systems or else the viscosities of the basecoat materials admixed with the aqueous dispersion.

The invention is described in particular by the following embodiments:

According to a first embodiment, the present invention relates to a method for producing a multicoat paint system (M) on a substrate (S) comprising
(1) optionally producing a cured first coat (S1) on the substrate (S) by application of a composition (Z1) to the substrate (S) and subsequent curing of the composition (Z1),
(2) producing a basecoat (BL2a) or two or more directly successive basecoats (BL2-x) directly on the first coat (S1) by application of an aqueous basecoat material (bL2a) directly to the first coat (S1) or directly successive application of two or more aqueous basecoat materials (bL2-x) to the first coat (S1),
(3) producing a clearcoat (K) directly on the basecoat (BL2a) or on the topmost basecoat (BL2-z) by application of a clearcoat material (kL) directly to the basecoat (BL2a) or to the topmost basecoat (BL2z),
(4) jointly curing the basecoat (BL2a) and the clearcoat (K) or the basecoats (BL2-x) and the clearcoat (K), the at least one basecoat material (bL2a) or at least one of the basecoat materials (bL2-x), directly prior to application, is mixed
with an aqueous dispersion (D1) comprising at least one polyamide (PA) having an acid number of 15 to 60 mg KOH/g or
with an aqueous dispersion (D2) comprising at least one polyamide (PA) and at least one amide wax (AW).

According to a second embodiment, the present invention relates to a method as set forth in embodiment 1, wherein the substrate (S) is selected from metallic substrates, plastics, and mixtures thereof, more particularly from metallic substrates.

According to a third embodiment, the present invention relates to a method as set forth in embodiment 1 or 2, wherein the composition (Z1) comprises an electrocoat material (ETL1) which is applied electrophoretically to the substrate (S).

According to a fourth embodiment, the present invention relates to a method as set forth in any of the preceding embodiments, wherein two directly successive basecoats (BL2-a) and (BL2-z) are produced on the cured first coat (S1) by applying an aqueous basecoat material (bL2-a) directly to the first coat (S1) and directly subsequently applying a further aqueous basecoat material (bL2-z) directly to the first basecoat (BL2-a).

According to a fifth embodiment, the present invention relates to a method as set forth in any of the preceding embodiments, wherein the basecoat material (bL2a) or at least one of the basecoat materials (bL2-x), preferably all the basecoat materials (bL2-x), are one-component coating materials.

According to a sixth embodiment, the present invention relates to a method as set forth in any of the preceding embodiments, wherein the basecoat material (bL2a) or at least one of the basecoat materials (bL2-x), preferably all basecoat materials (bL2-x), comprises at least one polymer as binder, selected from the group consisting of hydroxyfunctional polyurethanes, polyesters, polyacrylates, and copolymers of these polymers.

According to a seventh embodiment, the present invention relates to a method as set forth in any of the preceding embodiments, wherein the basecoat material (bL2a) or at least one of the basecoat materials (bL2-x), preferably all basecoat materials (bL2-x), comprises at least one color and/or effect pigment.

According to an eighth embodiment, the present invention relates to a method as set forth in any of the preceding embodiments, wherein the basecoat material (bL2a) or at least one of the basecoat materials (bL2-x), preferably all basecoat materials (bL2-x), comprises at least one melamine resin as crosslinking agent.

According to a ninth embodiment, the present invention relates to a method as set forth in any of the preceding embodiments, wherein the at least one polyamide (PA) in the aqueous dispersion (D1) and (D2) is a product of reaction of
a diamine having 2 to 34 carbon atoms and
a molar excess, based on the diamine, of a dicarboxylic acid having 4 to 36 carbon atoms, preferably 6 to 36 carbon atoms, or of a mixture of a dicarboxylic acid having 4 to 36 carbon atoms, preferably 6 to 36 carbon atoms, and a monocarboxylic acid having 2 to 22 carbon atoms, preferably 12 to 18 carbon atoms.

According to a tenth embodiment, the present invention relates to a method as set forth in any of the preceding embodiments, wherein the polyamide (PA) in the aqueous dispersion (D1) has an acid number of 20 to 50 mg KOH/g.

According to an eleventh embodiment, the present invention relates to a method as set forth in any of the preceding embodiments, wherein the polyamide (PA) in the dispersion (D1) and (D2) is neutralized to an extent of 80% to 100% with a base, preferably with N,N-dimethylethanolamine or triethylamine.

According to a twelfth embodiment, the present invention relates to a method as set forth in any of the preceding embodiments, wherein the aqueous dispersion (D1) has a solids content of 21 to 25 wt %, based on the total weight of the aqueous dispersion (D1).

According to a thirteenth embodiment, the present invention relates to a method as set forth in any of the preceding embodiments, wherein the at least one amide wax (AW) in the dispersion (D2) is a product of reaction of
a monocarboxylic acid having 2 to 22 carbon atoms, preferably 12 to 18 carbon atoms, and
a diamine having 2 to 12 carbon atoms, preferably 2 to 8 carbon atoms, and/or a monoamine having 2 to 22 carbon atoms, preferably 2 to 16 carbon atoms.

According to a fourteenth embodiment, the present invention relates to a method as set forth in any of the preceding embodiments, wherein the aqueous dispersion (D2) has a weight ratio of polyamide (PA) to amide wax (AW) of 95:5 to 40:60, preferably of 80:20 to 45:55.

According to a fifteenth embodiment, the present invention relates to a method as set forth in any of the preceding embodiments, wherein the aqueous dispersion (D1) or (D2) is added to the basecoat material (bL2a) or (bL2-a) which is applied directly to the first coat (S1).

According to a sixteenth embodiment, the present invention relates to a method as set forth in any of the preceding embodiments, wherein the aqueous dispersion (D1) or (D2) is added in each case in a total amount of 0.05 to 1.0 wt %, based on the solids content of the basecoat material (bL2a) or (bL2-x).

According to a seventeenth embodiment, the present invention relates to a method as set forth in any of the preceding embodiments, wherein the aqueous dispersion (D1) or (D2) is added after the establishment of the slumping of the basecoat (BL2a) or of at least one of the basecoats (BL2-x), the aqueous dispersion (D1) or (D2) being added to that basecoat material (bL2-a) or at least one of the basecoat materials (bL2-x) which has slipped from the underlying coat.

According to an eighteenth embodiment, the present invention relates to a method as set forth in any of the preceding embodiments, wherein the joint curing (4) is carried out at temperatures of 100 to 250° C. for a time of 5 to 60 minutes.

EXAMPLES

Description of Methods:
1. Solids Content (Nonvolatile Fraction)

The nonvolatile fraction is determined according to DIN EN ISO 3251 (date: June 2008). It involves weighing out 1 g of sample into an aluminum dish which has been dried beforehand, drying it in a drying oven at 130° C. for 60 minutes, cooling it in a desiccator and then reweighing it. The residue relative to the total amount of sample used corresponds to the nonvolatile fraction. The volume of the nonvolatile fraction may optionally be determined if necessary according to DIN 53219 (date: August 2009).

2. Glass Transition Temperature $T_g$

The glass transition temperature $T_g$ for the purposes of the invention is determined experimentally on the basis of DIN 51005 "Thermal Analysis (TA)—terms" and DIN 53765 "Thermal Analysis—Dynamic Scanning calorimetry (DSC)". This involves weighing out a 15 mg sample into a sample boat and introducing it into a DSC instrument. After cooling to the start temperature, 1st and 2nd measurement runs are carried out with inert gas flushing ($N_2$) of 50 ml/min with a heating rate of 10 K/min, with cooling to the start temperature again between the measurement runs. Measurement takes place customarily in the temperature range from about 50° C. lower than the expected glass transition temperature to about 50° C. higher than the glass transition temperature. The glass transition temperature for the purposes of the present invention, in accordance with DIN 53765, section 8.1, is that temperature in the 2nd measurement run at which half of the change in the specific heat capacity (0.5 delta $c_p$) is reached. This temperature is determined from the DSC diagram (plot of the heat flow against the temperature). It is the temperature at the point of intersection of the midline between the extrapolated baselines, before and after the glass transition, with the measurement plot.

3. Particle Size

The average particle size is determined by dynamic light scattering (photon correlation spectroscopy (PCS)) in accordance with DIN ISO 13321 (Date: October 2004). By average particle size here is meant the measured mean particle diameter (Z-average mean). The measurement uses a Malvern Nano S90 (from Malvern Instruments) at 25±1° C. The instrument covers a size range from 3 to 3000 nm and is equipped with a 4 mW He—Ne laser at 633 nm. The respective samples are diluted with particle-free deionized water as dispersing medium and then subjected to measurement in a 1 ml polystyrene cell at suitable scattering intensity. Evaluation took place using a digital correlator, with the assistance of the Zetasizer analysis software, version 7.11 (from Malvern Instruments). Measurement took place five times, and the measurements were repeated on a second, freshly prepared sample. For the aqueous dispersion of the anionic polyacrylate (wD-PAC), the average particle size refers to the arithmetic numerical mean of the measured average particle diameter (Z-average mean; numerical average). The standard deviation of a 5-fold determination here is <4%.

4. Determination of Low-Shear Viscosity at 1/s (after Adjustment to the Spray Viscosity) (Recording of 2D Plots)

To determine the low-shear viscosity of the waterborne basecoat material of the invention (or of the comparative compositions), the respective material, after adjustment to the respective spray viscosity, is investigated with a rotary viscometer conforming to DIN 53019-1 and calibrated to DIN 53019-2, under temperature-controlled conditions (23.0° C.±0.2° C.). In this investigation, the samples were subjected to shearing first for 5 minutes at a rate of $1000\ s^{-1}$ (loading phase) and then for 8 minutes at a rate of $1\ s^{-1}$ (unloading phase). The viscosity level after 8 minutes of unloading phase (low-shear viscosity) is determined from the measurement data.

5. Determination of Acid Number

The acid number is determined according to DIN EN ISO 2144 (date: June 2002), using "method A". The acid number corresponds to the mass of potassium hydroxide in mg which is needed to neutralize 1 g of sample under the conditions stipulated in DIN EN ISO 2114. The reported acid number corresponds here to the total acid number indicated in the DIN standard.

6. Determination of OH Number

The OH number is determined according to DIN 53240-2 (date: November 2007). In this method, the OH groups are reacted by acetylation with an excess of acetic anhydride. The excess acetic anhydride is subsequently cleaved to form acetic acid by addition of water, and the total acetic acid is back-titrated with ethanolic KOH. The OH number indicates the amount of KOH in mg which is equivalent to the amount of acetic acid bound in the acetylation of 1 g of sample.

7. Determination of Number-Average and Weight-Average Molecular Weight

The number-average molecular weight ($M_n$) is determined by gel permeation chromatography (GPC) according to DIN 55672-1 (date: August 2007). Besides the number-average molecular weight, this method can also be used, moreover, for determining the weight-average molecular weight ($M_w$) and also the polydispersity d (ratio of weight-average molecular weight ($M_w$) to number-average molecular weight ($M_n$)). Tetrahydrofuran is used as eluent. The determination is made against polystyrene standards. The column material consists of styrene-divinylbenzene copolymers.

8. Assessment of the Incorporation of the Additives and the Homogeneity of the Resulting Basecoat Material The mixture of a waterborne basecoat material with additive is evaluated visually for the incorporation of the additive and for the homogeneity, respectively. The criteria on which these evaluations are based are as follows:
 a) Incorporation: an assessment is made of the extent to which the additive can be mixed with the respective waterborne basecoat material under defined stirring conditions. Critical factors are whether the addition causes streaks, specks or the like.
 b) Homogeneity: an assessment is made of the extent to which a homogeneous mixture is formed after 10 minutes of stirring, i.e., of whether the waterborne basecoat material and the additive can be combined to form a mixture which is a one-phase mixture on the macroscopic scale, or whether two or more phases form as a result of separation even during weighing out or within a few minutes after the components are stirred together.

A qualitative assessment is made on a scale from 1 to 4 (1=highly incorporable or very homogeneous, 2=readily incorporable or homogeneous, 3=poorly incorporable or inhomogeneous, 4=very poorly incorporable or very inhomogeneous, respectively).

To validate the incorporation and homogeneity, respectively, a commercial 1 L tinplate can (diameter: around 110 mm/height: around 140 mm) is filled two thirds with the waterborne basecoat material in question. Following addition of the additive, the mixture is stirred for 10 minutes using a customary laboratory mixer (for example from Vollrath, model EWTHV 0.5) using a Lenart disk (diameter: 65 mm). It should be borne in mind here that a simplified Reynolds number for stirring operations, $Re'_R$, of at most 1000 is reached, so that substantially there is laminar mixing, but no dispersing work as a result of turbulence.

The Reynolds number for stirring operations, $Re_R$, is familiar to the skilled person; it is defined as $$Re_R = \frac{\rho \cdot d^2 \cdot n}{\eta},$$

ρ=density in kg·m$^{-3}$
d=stirring blade diameter in m
n=rotary speed in s$^{-1}$, and
η=dynamic viscosity in kg·m$^{-1}$·s$^{-1}$ The density of a representative waterborne basecoat material was determined by means of DIN 53217-2:1991-03. The value found, of 1135 kg·m$^{-3}$, is assumed, for simplification, for all of the waterborne basecoat materials used in step (2) in the method of the invention. For the actually shear-dependent dynamic viscosity, a value of 0.1 Pas is assumed, as a simplification, for all the samples, hence giving the following term for the simplified Reynolds number for stirring operations $Re'_R$:

$$Re'_R = 11350 \cdot s \cdot m^{-2} \cdot d^2 \cdot n$$

9. Assessment of the Incidence of Pops and Runs

To determine the propensity toward running of an inventive coating composition (or a comparative coating composition), in accordance with DIN EN ISO 28199-1 (date: January 2010) and DIN EN ISO 28199-3 (date: January 2010), multicoat paint systems are produced according to the following general protocol:

A perforated steel panel coated with a standard CEC (CathoGuard® 800 from BASF Coatings GmbH), with dimensions of 57 cm×20 cm (according to DIN EN ISO 28199-1, section 8.1, version A) is prepared in analogy to DIN EN ISO 28199-1, section 8.2 (version A). Subsequently, in accordance with DIN EN ISO 28199-1, section 8.3, application of the aqueous basecoat material takes place in a single application voltage-free, by means of a rotary atomizer, in the form of a wedge, with a target film thickness (film thickness of the dried material) in the range from 5 µm to 40 µm. After a flashing time at 18-23° C. of 4 minutes, the resulting waterborne basecoat is subjected to drying in a forced air oven at 70° C. for 10 minutes. In this case, the panels are flashed and dried in a vertical position.

The determination of the running tendency is carried out according to DIN EN ISO 28199-3, section 4. As well as the film thickness at which a run exceeds a length of 10 mm from the bottom edge of the perforation, a determination is made of the film thickness above which an initial tendency to run can be observed visually at a perforation.

10. Determination of Dry Film Thicknesses

The film thicknesses are determined according to DIN EN ISO 2808 (date: May 2007), method 12A, using the MiniTest® 3100-4100 instrument from ElektroPhysik.

11. Determination of Slumping of Waterborne Basecoat Material Wedge Systems

To assess the slumping of waterborne basecoat material wedge systems, multicoat paint systems in wedge form are produced according to the following general protocol:

A diagonally perforated steel panel with dimensions of 20×50 cm, coated with a standard cathodic electrocoat (CathoGuard® 500 from BASF Coatings), is provided on one long edge with 2 adhesive strips (Tesaband, 19 mm) (the first adhesive strip is removed after application of the first waterborne basecoat material (bL2-a); the second adhesive strip is removed after application of the second waterborne basecoat material (bL2-z), to allow the determination of differences in film thickness after coating.

The first waterborne basecoat material (bL2-a) is applied electrolessly in a single application by means of a rotational atomizer, in the form of a wedge with a target film thickness (film thickness of the dried material) of 5-40 µm. After a flash-off time of 4 minutes at room temperature, the second basecoat material (bL2-z) is applied electrostatically as a constant layer with a target film thickness of 12-15 µm.

After a further 20 minutes of flashing off at room temperature, a commercial two-component clearcoat material (ProGloss® from BASF Coatings GmbH) is applied with a dry film thickness of 40 to 45 µm. The resulting clearcoat film is flashed off at room temperature for a time of 10 minutes. This is followed by curing in a forced air oven at 140° C. for 20 minutes.

A determination is made of the film thickness of the first basecoat (BL2-a) from which there is slumping of the first basecoat (BL2-a).

WORKING EXAMPLES

The following inventive and comparative examples serve to elucidate the invention, but should not be interpreted as imposing any limitation.

The following should be taken into account regarding the formulation constituents and amounts thereof indicated. When reference is made to a commercial product or to a preparation protocol described elsewhere, the reference, independently of the principle designation selected for the constituent in question, is to precisely this commercial product or precisely the product prepared with the referenced protocol.

Accordingly, where a formulation constituent possesses the principal designation "melamine-formaldehyde resin" and where a commercial product is indicated for this constituent, the melamine-formaldehyde resin is used in the form of precisely this commercial product. Any further constituents present in the commercial product, such as solvents, must therefore be taken into account if conclusions are to be drawn about the amount of the active substance (of the melamine-formaldehyde resin).

If, therefore, reference is made to a preparation protocol for a formulation constituent, and if such preparation results, for example, in a polymer dispersion having a defined solids content, then precisely this dispersion is used. The overriding factor is not whether the principal designation that has been selected is the term "polymer dispersion" or merely the active substance, for example, "polymer", "polyester", or "polyurethane-modified polyacrylate". This must be taken into account if conclusions are to be drawn concerning the amount of the active substance (of the polymer).

1. Production of a Mixing Varnish ML1

In accordance with patent specification EP 1534792-B1, column 11, lines 1-13, 81.9 parts by weight of deionized water, 2.7 parts by weight of Rheovis® AS 1130 (available from BASF SE), 8.9 parts by weight of 2,4,7,9-tetramethyl-5-decynediol, 52% in BG (available from BASF SE), 3.2 parts by weight of Dispex Ultra FA 4437 (available from BASF SE), and 3.3 parts by weight of 10% dimethylethanolamine in water are mixed with one another; the resulting mixture is subsequently homogenized.

2. Preparation of Color Pastes 2.1 Preparation of a White Paste P1

The white paste P1 is prepared from 50 parts by weight of titanium rutile R-960-38, 11 parts by weight of a polyester prepared as per example D, column 16, lines 37-59 of DE 40 09 858 A1, 16 parts by weight of a binder dispersion prepared as per international patent application WO 92/15405, page 15, lines 23-28, 16.5 parts by weight of deionized water, 3 parts by weight of butyl glycol, 1.5 parts by weight of 10% strength dimethylethanolamine in water, and 1.5 parts by weight of Pluriol® P900, available from BASF SE.

2.2 Preparation of a White Paste P2

The white paste P2 is prepared from 50 parts by weight of titanium rutile 2310, 6 parts by weight of a polyester prepared as for example D, column 16, lines 37-59 of DE 40 09 858 A1, 24.7 parts by weight of a binder dispersion prepared as per patent application EP 022 8003 B2, page 8, lines 6 to 18, 10.5 parts by weight of deionized water, 4 parts by weight of 2,4,7,9-tetramethyl-5-decynediol, 52% in BG (available from BASF SE), 4.1 parts by weight of butyl glycol, 0.4 part by weight of 10% strength dimethylethanolamine in water, and 0.3 part by weight of Acrysol RM-8 (available from The Dow Chemical Company).

2.3 Preparation of a Black Paste P3

The black paste P3 is prepared from 57 parts by weight of a polyurethane dispersion prepared as per WO 92/15405, page 13, line 13 to page 15, line 13, 10 parts by weight of carbon black (Monarch® 1400 carbon black from Cabot Corporation), 5 parts by weight of a polyester prepared as per example D, column 16, lines 37-59 of DE 40 09 858 A1, 6.5 parts by weight of a 10% strength aqueous dimethylethanolamine solution, 2.5 parts by weight of a commercial polyether (Pluriol® P900, available from BASF SE), 7 parts by weight of butyl diglycol, and 12 parts by weight of deionized water.

2.4 Preparation of a Black Paste P4

The black paste P4 is prepared from 58.9 parts by weight of a polyurethane dispersion prepared as per WO 92/15405, page 13, line 13 to page 15, line 13, 10.1 parts by weight of carbon black (Color Black FW2 from Orion Engineered Carbons), 5 parts by weight of a polyester prepared as per example D, column 16, lines 37-59 of DE 40 09 858 A1, 7.8 parts by weight of a 10% strength aqueous dimethylethanolamine solution, 2.2 parts by weight of a commercial polyether (Pluriol® P900, available from BASF SE), 7.6 parts by weight of butyl diglycol, and 8.4 parts by weight of deionized water.

2.5 Preparation of a Yellow Paste P5

The yellow paste P5 is prepared from 37 parts by weight of Bayferrox 3910 (available from Lanxess), 49.5 parts by weight of an aqueous binder dispersion prepared as per WO 91/15528, page 23, line 26 to page 25, line 24, 7.5 parts by weight of Disperbyk®-184 (available from BYK-Chemie GmbH), and 6 parts by weight of deionized water.

2.6 Preparation of a Yellow Paste P6

The yellow paste P6 is prepared from 17.3 parts by weight of Sicotrans yellow L 1916, available from BASF SE, 18.3 parts by weight of a polyester prepared as per example D, column 16, lines 37-59 of DE 40 09 858 A1, 43.6 parts by weight of a binder dispersion prepared in accordance with the international patent application WO 92/15405, page 15, lines 23-28, 16.5 parts by weight of deionized water, and 4.3 parts by weight of butyl glycol.

2.7 Preparation of a White Paste P7

The white paste P7 is prepared from 30.0 parts by weight of titanium rutile MT-500 HD, available from Tayca Corp., 62.9 parts by weight of a binder dispersion prepared as per the international patent application WO 92/15405, page 15, lines 23-28, 3.8 parts by weight of deionized water, 2.0 parts by weight of Pluriol® P900 (available from BASF SE), 0.4 parts by weight of 10% dimethylethanolamine in water, and 0.9 parts by weight of Aerosil® R972 (available from Evonik).

2.8 Preparation of a Silica Paste P8

The silica paste P8 is prepared from 12.0 parts by weight of Syloid® ED 3, available from W.R. Grace & Co., 30.0 parts by weight of a polyester prepared as per example D, column 16, lines 37-59 of DE 40 09 858 A1, 46.0 parts by weight of butyl glycol, and 12.0 parts by weight of 10% dimethylethanolamine in water.

2.9 Preparation of a Blue Paste P9

The blue paste P9 is prepared from 33.0 parts by weight of Heucodur® Blue 550 (available from Heubach GmbH), 52.0 parts by weight of an aqueous binder dispersion prepared as per WO 91/15528, page 23, line 26 to page 25, line 24, 5.7 parts by weight of deionized water, 3.0 parts by weight of Pluriol® P900 (available from BASF SE), 4.0 parts by weight of Disperbyk® 184 (available from BYK-Chemie GmbH), 2.0 parts by weight of a 3 wt % strength aqueous Rheovis® AS 1130 solution (Rheovis® AS 1130 available from BASF SE), and 0.3 parts by weight of Agitan 282 (available from Munzing Chemie GmbH).

2.10 Preparation of a Green Paste P10

The green paste P10 is prepared from 35.6 parts by weight of Daipyroxide Green 9320 (available from Dainichiseika Color & Chemicals Mfg. Co., Ltd.), 50.5 parts by weight of an aqueous binder dispersion prepared as per WO 91/15528, page 23, line 26 to page 25, line 24, 6.1 parts by weight of deionized water, 3.2 parts by weight of Pluriol® P900 (available from BASF SE), 4.3 parts by weight of Disperbyk® 184 (available from BYK-Chemie GmbH), and 0.3 parts by weight of Agitan 282 (available from Munzing Chemie GmbH).

3. Preparation of Aqueous Basecoat Materials

Unless otherwise indicated, statements in parts are parts by weight and statements in percent are percentages by weight in each case.

3.1 Preparation of the Waterborne Basecoat Materials WBM A1 and WBM A2

The components listed in table 3.1 are combined with stirring in the order stated to form an aqueous mixture. This mixture is then stirred for 10 minutes and adjusted using deionized water and dimethylethanolamine to a pH of 8.0±0.2 and to a spray viscosity of 100±10 mPa·s under a shearing load of 1291 s$^{-1}$ (WBM A1) or 85±10 mPa·s under a shearing load of 1000 s$^{-1}$ (WBM A2), as measured using a rotary viscometer (Rheolab QC instrument with C-LTD80/QC heating system from Anton Paar) at 23° C.

TABLE 3.1

Preparation of waterborne basecoat materials WBM A1 WBM A2

| | WBM A1 | WBM A2 |
|---|---|---|
| Deionized water | — | 8.55 |
| 2-Ethylhexanol | — | 1.60 |
| Aqueous binder dispersion; prepared as per pages 63-66 (example BM2) of WO 2017/088988 A1 | — | 28.70 |
| Daotan ® VTW 6466/36WA, available from Allnex | 25.15 | — |
| Polyester; prepared as per example D, column 16, lines 37-59 of DE 40 09 858 A1 | — | 3.90 |
| Polyester; prepared as per page 28, lines 13 to 33 (example BE1) of WO 2014/033135 A2 | — | 2.60 |
| Melamine-formaldehyde resin (Cymel ® 203 from Allnex) | 9.98 | 9.85 |
| 10% Dimethylethanolamine in water | — | 0.20 |
| Polyurethane-modified polyacrylate; prepared as per page 7, line 55 to page 8, line 23 of DE 4437535 A1 | 5.84 | — |
| Butyl glycol | — | 2.60 |
| Isopar ® L, available from Exxon Mobil | — | 2.10 |
| Isotridecyl alcohol | — | 1.60 |
| White paste P1 | 53.99 | — |
| White paste P2 | — | 35.60 |
| Black paste P3 | 3.23 | — |
| Black paste P4 | — | 1.2 |
| Yellow paste P5 | 1.80 | — |
| Yellow paste P6 | — | 1.50 |

3.2 Preparation of the Waterborne Basecoat Material WBM B1

The components listed under "Aqueous Phase" in table 3.2 are combined with stirring in the order stated to form an aqueous mixture. In the next step, a premix is prepared from the components listed under "Aluminum pigment premix". This premix is added to the aqueous mixture. Addition of the premix is followed by stirring for 10 minutes. The resulting mixture is subsequently adjusted using deionized water and dimethylethanolamine to a pH of 8 and to a spray viscosity of 70±10 mPa·s under a shearing load of 1291 s$^{-1}$, as measured using a rotary viscometer (Rheolab QC instrument with C-LTD80/QC heating system from Anton Paar) at 23° C.

TABLE 3.2

Preparation of waterborne basecoat material WBM B1

| | Amount |
|---|---|
| Aqueous phase: | |
| 3% strength Na Mg phyllosilicate solution | 15.00 |
| Deionized water | 31.30 |
| n-Butoxypropanol | 4.00 |
| Daotan ® VTW 6464/36WA, available from Allnex | 10.00 |
| Polyester; prepared as per example D, column 16, lines 37-59 of DE 40 09 858 A1 | 3.80 |
| Polyurethane-modified polyacrylate; prepared as per page 7, line 55 to page 8, line 23 of DE 4437535 A1 | 3.00 |
| 3 wt % aqueous Rheovis ® AS 1130 solution, Rheovis ® AS 1130 available from BASF SE | 3.50 |
| Acronal ® S 790 from BASF SE | 2.00 |
| Melamine-formaldehyde resin (Luwipal ® 052 from BASF SE) | 5.50 |
| 10% Dimethylethanolamine in water | 1.00 |
| Pluriol ® P900, available from BASF SE | 1.00 |
| 2,4,7,9-Tetramethyl-5-decynediol, 52% in BG (available from BASF SE) | 1.00 |
| Butyl glycol | 0.50 |
| 50 wt % strength solution of Rheovis ® PU1250 in butyl glycol (Rheovis ® PU1250 available from BASF SE) | 1.20 |
| Tris (2-butoxyethyl) phosphate | 1.50 |
| White paste P7 | 0.30 |
| Silica paste P8 | 0.70 |
| Aluminum pigment premix: | |
| Mixture of two commercial aluminum pigments, available from Altana-Eckart (Alu Stapa Hydrolux VP56450 & 1071 in a ratio of 1.0:1.0) | 5.40 |
| Butyl glycol | 6.00 |
| Polyester; prepared as per example D, column 16, lines 37-59 of DE 40 09 858 A1 | 3.30 |

3.3 Preparation of the Waterborne Basecoat Materials WBM B2 and WBM B3

The components listed under "Aqueous Phase" in table 3.3 are combined with stirring in the order stated to form an aqueous mixture. In the next step, a premix is prepared in each case from the components listed under "Aluminum pigment premix" and "mica pigment premix", respectively. These premixes are added separately to the aqueous mixture. Addition of a premix is followed by stirring for 10 minutes in each case. The resulting mixture is subsequently adjusted using deionized water and dimethylethanolamine to a pH of 8 and to a spray viscosity of 85±10 mPa·s under a shearing load of 1000 s$^{-1}$, as measured using a rotary viscosimeter (Rheolab QC instrument with C-LTD80/QC heating system from Anton Paar) at 23° C.

TABLE 3.3

Preparation of waterborne basecoat materials WBM B2 and WBM B3

| | WBM B2 | WBM B3 |
|---|---|---|
| Aqueous phase: | | |
| 3% strength Na Mg phyllosilicate solution | 15.0 | 15.0 |
| Deionized water | 12.8 | 12.8 |
| 2-Ethylhexanol | 2.8 | 2.8 |
| Aqueous binder dispersion prepared as per pages 63-66 (example BM2) WO 2017/088988 A1 | 25.0 | 25.0 |
| Polyester; prepared as per example D, column 16, lines 37-59 of DE 40 09 858 A1 | 3.0 | 3.0 |
| Polyurethane-modified polyacrylate; prepared as per page 7, line 55 to page 8, line 23 of DE 4437535 A1 | 3.4 | 3.4 |

TABLE 3.3-continued

Preparation of waterborne basecoat materials WBM B2 and WBM B3

|  | WBM B2 | WBM B3 |
|---|---|---|
| 3 wt % aqueous Rheovis ® AS 1130 solution, Rheovis ® AS 1130 available from BASF SE | 8.0 | 8.0 |
| Melamine-formaldehyde resin (Cymel ® 203 from Allnex) | 7.6 | 7.6 |
| 10% Dimethylethanolamine in water | 0.4 | 0.4 |
| Pluriol ® P900, available from BASF SE | 1.1 | 1.1 |
| 2,4,7,9-Tetramethyl-5-decynediol, 52% in BG (available from BASF SE) | 1.2 | 1.2 |
| Butyl glycol | 0.5 | 0.5 |
| 50 wt % strength solution of Rheovis ® PU1250 in butyl glycol (Rheovis ® PU1250 available from BASF SE) | 0.6 | 0.6 |
| Blue paste P9 | 0.5 | 0.5 |
| Green paste P10 | 0.1 | 0.1 |
| Aluminum pigment premix: | | |
| Mixture of two commercial aluminum pigments, available from Altana-Eckart (Stapa ® Hydrolan 2192 & Hydrolan 8154 in a ratio of 7.5:1) | 6.5 | — |
| Mixture of three commercial aluminum pigments, available from Altana-Eckart (Stapa ® Hydrolan VP 56450/G, Hydrolan 2192 and Hydrolan 8154 in a ratio of 4:3.5:1) | — | 6.5 |
| Butyl glycol | 5.3 | 5.3 |

TABLE 3.3-continued

Preparation of waterborne basecoat materials WBM B2 and WBM B3

|  | WBM B2 | WBM B3 |
|---|---|---|
| Polyester; prepared as per example D, column 16, lines 37-59 of DE 40 09 858 A1 | 2.0 | 2.0 |
| 10% Dimethylethanolamine in water | 0.2 | 0.2 |
| Mica pigment premix: | | |
| Mixing varnish ML1 | 2.9 | 2.9 |
| Commercial mica pigment Iriodin ® 9225 Rutile Pearl Blue from Merck | 1.0 | 1.0 |

3.4 Postadditization of the Waterborne Basecoat Materials WBM A1 and WBM A2

Added to the waterborne basecoat materials WBM A1 and WBM A2 in each case are the amounts of additive (i.e. aqueous dispersion comprising at least one polyamide (PA) and/or amide wax (AW)) listed in tables 3.4, 3.5 and 3.6, followed by stirring for 10 minutes. The resulting mixture is adjusted using deionized water to a spray viscosity of 100±10 mPa·s under a shearing load of 1291 s$^{-1}$ (WBM A1a to WBM A1d) or 85±10 mPa·s under a shearing load of 1000 s$^{-1}$ (WBM A2a to WBM 2j), as measured using a rotary viscometer (Rheolab QC instrument with C-LTD80/QC heating system from Anton Paar) at 23° C.

TABLE 3.4

Preparation of waterborne basecoat materials WBM A1a to WBM A1d

|  | WBM A1a | WBM A1b | WBM A1c | WBM A1d |
|---|---|---|---|---|
| WBM A1 | 100.0 | 100.0 | 100.0 | 100.0 |
| Additive 1[1)] | 3.6 | — | — | — |
| Additive 2[2)] | — | 3.6 | 1.8 | 0.9 |
| Fraction of additive (wt % solids) | 0.8% | 0.5% | 0.3% | 0.1% |

[1)]Aqueous dispersion (D1) of polyamide (PA), solids content 22.5 wt %, acid number 24 mg KOH/g
[2)]Aqueous dispersion (D2) of polyamide (PA) and amide wax (AW), solids content 15 wt %, acid number 8.7 mg KOH/g

TABLE 3.5

Preparation of waterborne basecoat materials WBM A2a to WBM A2f

|  | WBM A2a | WBM A2b | WBM A2c | WBM A2d | WBM A2e | WBM A2f |
|---|---|---|---|---|---|---|
| WBM A2 | 100.0 | 100.0 | 100.0 | 100.0 | 100.0 | 100.0 |
| Additive 1[1)] | 3.0 | 2.0 | — | — | — | — |
| Additive 2[2)] | — | — | 2.0 | — | — | — |
| Additive 3[3)] | — | — | — | 2.0 | — | — |
| Additive 4[4)] | — | — | — | — | 2.0 | — |
| Additive 5[5)] | — | — | — | — | — | 2.0 |
| Fraction of additive (wt % solids) | 0.45% | 0.30% | 0.20% | 0.45% | 0.40% | 0.30% |

[1)]Aqueous dispersion (D2) of polyamide (PA) and amide wax (AW), solids content 15 wt %, acid number 8.7 mg KOH/g
[2)]Aqueous dispersion (D2) of polyamide (PA) and amide wax (AW), solids content 10 wt %, acid number 7.5 mg KOH/g
[3)]Aqueous dispersion (D1) of polyamide (PA), solids content 22.5 wt %, acid number 24 mg KOH/g
[4)]Aqueous dispersion of polyamide (PA), solids content 20 wt %, acid number 12.5 mg KOH/g
[5)]Aqueous dispersion of polyamide (PA), solids content 15 wt %, acid number 14 mg KOH/g

TABLE 3.6

Preparation of waterborne basecoat materials WBM A2g to WBM A2j

|  | WBM A2g | WBM A2h | WBM A2i | WBM A2j |
|---|---|---|---|---|
| WBM A2 | 100.0 | 100.0 | 100.0 | 100.0 |
| Additive 6[6)] | 2.0 | — | — | — |
| Additive 7[7)] | — | 0.3 | 0.4 | — |
| Additive 8[8)] | — | — | — | 0.4 |
| Deionized water | — | 2.7 | 3.6 | — |
| 10% Dimethylethanolamine in water | — | 0.4 | 0.4 | — |

TABLE 3.6-continued

Preparation of waterborne basecoat
materials WBM A2g to WBM A2j

|  | WBM A2g | WBM A2h | WBM A2i | WBM A2j |
|---|---|---|---|---|
| Fraction of postadditive (wt % solids) | 0.35% | 0.10% | 0.10% | 0.20% |

[6] Aqueous dispersion of polyamide (PA), solids content 18 wt %, acid number 12.5 mg KOH/g
[7] 30 wt % strength aqueous Rheovis ® AS 1130 solution (BASF SE)
[8] 50 wt % strength solution of Rheovis ® PU1250 in butyl glycol (BASF SE)

4. Effect of Postadditization on Properties of Waterborne Basecoat Materials 4.1 Comparison Between Waterborne Basecoat Materials WBM A1 and WBM A1a to WBM A1d in Respect of Incidence of Slumps The studies on the waterborne basecoat materials WBM A1 and, respectively, WBM A1a to WBM A1d (containing different additives in various amounts) in combination with WBM B1 with regard to the incidence of slumps were made qualitatively in accordance with the method described above (see section 11 of the Description of Methods). Table 4.1 summarizes the results.

TABLE 4.1

Comparison of the behavior of WBM A1 (without additive) and WBM A1a to WBM A1b (with additive) with regard to the incidence of slumps

| 1st basecoat | 2nd basecoat | Slags |
|---|---|---|
| WBM A1 (reference) | WBM B1 | present; unsatisfactory |
| WBM A1a | WBM B1 | none; satisfactory |
| WBM A1b | WBM B1 | none; satisfactory |
| WBM A1c | WBM B1 | none; satisfactory |
| WBM A1d | WBM B1 | none; satisfactory |

Where, in the case of a multicoat paint system in accordance with the method described above, the sample WBM A1 is used as first waterborne basecoat material (bL2-a) in combination with WBM B1 as second waterborne basecoat material (bL2-z), the phenomenon of slumping occurs and the final coating has to be designated as unacceptable. If, conversely, the first basecoat material WBM A1 (bL2-a) is admixed, shortly prior to application, with an aqueous dispersion (D1) (WBM A1a) or (D2) (WBM A1b to WBM A1d), then the first waterborne basecoat film (BL2-a) no longer slumps from the underlying coat (S1), and the coated substrate (S) satisfies the exacting quality requirements of an OEM finish. The method of the invention therefore allows the quality of the resultant multicoat paint system to be significantly improved, and paint wastes to be avoided.

4.2 Comparison Between Waterborne Basecoat Materials WBM A2 and WBM A2a to WBM A2j with Regard to the Incorporation of the Additive The studies on the waterborne basecoat materials WBM A2 (no additive) and WBM A2a to WBM A2j (containing different additives in various amounts) in combination with WMB B2 or WBM B3 with regard to the incorporation of the additive, the effect on the low-shear viscosity, and the incidence of slumps were made in accordance with the above-described method (see section 8 of the Description of Methods).

TABLE 4.2

Results of the studies on the incorporation of the respective additive

|  | WBM A2a | WBMA 2b | WBM A2c | WBM A2d | WBM A2e | WBM A2f | WBM A2g | WBM A2h | WBM A2i | WBM A2j |
|---|---|---|---|---|---|---|---|---|---|---|
| Incorporation | 1 | 1 | 1 | 2 | 3 | 3 | 3 | 1 | 1 | 1 |
| Homogeneity | 1 | 1 | 1 | 1 | 3 | 4 | 4 | 1 | 1 | 1 |

1 = highly incorporable or highly homogeneous,
2 = readily incorporable or homogeneous,
3 = poorly incorporable or inhomogeneous,
4 = very poorly incorporable or very inhomogeneous In the case of the waterborne basecoat materials WBM A2a to WBM A2d, which contain either an aqueous dispersion (D1) (WBM 2d) or an aqueous dispersion (D2) (WBM 2a to WBM 2c), the postadditization of WBM A2 proved to be very good or good. The respective dispersions (D1) or (D2) could be incorporated with moderate input of energy, as achievable at most for the subsequent additization of material by the OEM customer, and resulted in very homogeneous mixtures. Conversely, the dispersions of polyamides (PA) having acid numbers of less than 15 mg KOH/g (WBM A2e to WBM A2g) not only were significantly more difficult to incorporate, but their incorporation led in some cases to significant inhomogeneities.

The use of the ASE thickener (ASE=alkali swellable emulsion) Rheovis® AS 1130 (WBM A2h and WBM A2i) and also of the nonionic polyurethane thickener Rheovis® PU 1250 (WBM A2j) was likewise possible without incorporation problems and led to very homogeneous mixtures.

4.3 Comparison Between the Waterborne Basecoat Materials WBM A2 and WBM A2a to WBM A2j with Regard to the Effect of the Additive on the Low-Shear Viscosity A great disadvantage of the Rheovis® PU 1250 thickener was that the postadditization of WBM A2 with this component led to a very significant increase in the high-shear viscosity (spray viscosity at 1000 $s^{-1}$). Consequently, it was necessary to add copious water in order to carry out adjustment to the appropriate spray viscosity (see table 4.3). A consequence of this in turn was that the solids content and also the low-shear viscosity (at 1 s$^{-1}$) of WBM A2j were significantly lower in contrast to WBM A2, with negative consequences for the running stability and the slump characteristics (see table 4.4). In contrast, in the case of waterborne basecoat material WBM A2c, the amount of water required to adjust to the spray viscosity after postadditization is significantly lower, and there is also no sharp decrease recorded in the low-shear viscosity (see table 4.3 and also section 4 of the Description of Methods).

TABLE 4.3

Results of the studies into effects of postadditization on low-shear and high-shear viscosity

|  | WBM A2 | WBM A2c | WBM A2j |
|---|---|---|---|
| High-shear viscosity at 1000/s (before adjustment to spray viscosity) [mPa · s] | 83 | 110 | 240 |
| Addition of water [%] | 0 | 4 | 16 |
| Adjusted spray viscosity at 1000/s [mPa · s] | 83 | 83 | 83 |
| Low-shear viscosity at 1/s (after adjustment to the spray viscosity) [mPa · s] | 2000 | 2800 | 1040 |

4.4 Comparison Between the Waterborne Basecoat Materials WBM A2 and WBM A2a to WBM A2j with Regard to the Incidence of Slumps The experimental data compiled in table 4.4 demonstrate that the waterborne basecoat materials WBM A2a to WBM A2d in combination with WBM B2 or WBM 3 exhibit not only a propensity to run which is significantly better than the respective reference, but also a significantly improved slump propensity. WBM A2j, containing the nonionic polyurethane thickener Rheovis® PU 1250, is significantly more critical than the reference. The use of the ASE thickener Rheovis® AS 1130 (WBM A2h and WBM A2i) leads neither to any significant improvement in the propensity to runs nor in the propensity to slumps.

TABLE 4.4

Results of the studies into effects of postadditization on the propensity to run and to slump

| 1$^{st}$ basecoat (bL12-a) | 2$^{nd}$ basecoat (bL2-z) | Running limit film thickness WBM A2a-k [μm] | Slags film thickness WBM A2a-k [μm] |
|---|---|---|---|
| WBM A2 (Reference) | WBM B2 | 16 | 19 |
| WBM A2a | WBM B2 | 25 | 39 |
| WBM A2 (Reference) | WBM B3 | 16 | 26 |
| WBM A2a | WBM B3 | >40 | >40 |
| WBM A2b | WBM B3 | 24 | 37 |
| WBM A2c | WBM B3 | 20 | 37 |
| WBM A2d | WBM B3 | 27 | >40 |
| WBM A2e | WBM B3 | 22 | 32 |
| WBM A2f | WBM B3 | 21 | 24 |
| WBM A2g | WBM B3 | 21 | 30 |
| WBM A2h | WBM B3 | 20 | 27 |
| WBM A2i | WBM B3 | 16 | 29 |
| WBM A2j | WBM B3 | 10 | 17 |

From the tests it is therefore apparent that by adding an aqueous dispersion (D1) or (D2), it is possible to lower significantly the propensity of waterborne basecoat materials in multicoat systems to exhibit runs and slumps, without any adverse effect on the low-shear or high-shear viscosity and hence on the service properties. The method of the invention therefore enables the properties of waterborne basecoat materials to be adapted, in a simple way, such that there is no longer any slumping of the waterborne basecoat film. Accordingly, through the postadditization, it is also possible to produce multicoat systems using waterborne basecoat materials which without postadditization are outside of specification in relation to the running and slumping properties and therefore cannot be put to further use.

What is claimed is:

1. A method for producing a multicoat paint system (M) on a substrate (S), comprising
   (1) optionally producing a cured first coat (S1) on the substrate (S) by application of a composition (Z1) to the substrate (S) and subsequent curing of the composition (Z1),
   (2) producing a basecoat (BL2a) or two or more directly successive basecoats (BL2-x) directly on the first coat (S1) by application of an aqueous basecoat material (bL2a) directly to the first coat (S1) or directly successive application of two or more aqueous basecoat materials (bL2-x) directly to the first coat (S1),
   (3) producing a clearcoat (K) directly on the basecoat (BL2a) or on a topmost basecoat (BL2-z) by application of a clearcoat material (kL) directly to the basecoat (BL2a) or to the topmost basecoat (BL2-z),
   (4) jointly curing the basecoat (BL2a) and the clearcoat (K) or the basecoats (BL2-x) and the clearcoat (K), wherein
   the basecoat material (bL2a) or at least one of the basecoat materials (bL2-x), directly prior to application, is mixed
      with an aqueous dispersion (D1) comprising at least one polyamide (PA) having an acid number of 20 to 50 mg KOH/g or
      with an aqueous dispersion (D2) comprising at least one polyamide (PA) and at least one amide wax (AW).

2. The method as claimed in claim 1, wherein the substrate (S) is selected from the group consisting of metallic substrates, plastics, and mixtures thereof.

3. The method as claimed in claim 1, wherein two directly successive basecoats (BL2-a) and (BL2-z) are produced on the cured first coat (S1) by applying the aqueous basecoat material (bL2a) directly to the first coat (S1) and directly subsequently applying a further aqueous basecoat material (bL2-z) directly to the first basecoat (BL2-a).

4. The method as claimed in claim 1, wherein the basecoat material (bL2a) or at least one of the basecoat materials (bL2-x), are one-component coating compositions.

5. The method as claimed in claim 1, wherein the basecoat material (bL2a) or at least one of the basecoat materials (bL2-x), comprises at least one polymer as binder, selected from the group consisting of hydroxyfunctional polyurethanes, polyesters, polyacrylates, and copolymers of these polymers.

6. The method as claimed in claim 1, wherein the basecoat material (bL2a) or at least one of the basecoat materials (bL2-x) comprises at least one color and/or effect pigment.

7. The method as claimed in claim 1, wherein the basecoat material (bL2a) or at least one of the basecoat materials (bL2-x), comprises at least one melamine resin as crosslinking agent.

8. The method as claimed in claim 1, wherein the at least one polyamide (PA) in the dispersion (D1) and (D2) is a product of reaction of
   a diamine having 2 to 34 carbon atoms and
   a molar excess, based on the diamine, of a dicarboxylic acid having 4 to 36 carbon atoms, or of a mixture of a dicarboxylic acid having 4 to 36 carbon atoms and a monocarboxylic acid having 2 to 22 carbon atoms.

9. The method as claimed in claim 1, wherein the at least one polyamide (PA) in the dispersion (D1) and (D2) is neutralized to an extent of 80% to 100% with a base.

10. The method as claimed in claim 1, wherein the at least one amide wax (AW) in the dispersion (D2) is a product of reaction of
a monocarboxylic acid having 2 to 22 carbon atoms, and
a diamine having 2 to 12 carbon atoms, and/or a monoamine having 2 to 22 carbon atoms.

11. The method as claimed in claim 1, wherein the aqueous dispersion (D2) has a weight ratio of polyamide (PA) to amide wax (AW) of 95:5 to 40:60.

12. The method as claimed in claim 1, wherein the aqueous dispersion (D1) or (D2) is added to the basecoat material (bL2a) which is applied directly to the first coat (S1).

13. The method as claimed in claim 1, wherein the aqueous dispersion (D1) or (D2) is added after the establishment of the slumping of the basecoat (BL2a) or of at least one of the basecoats (BL2-x), the aqueous dispersion (D1) or (D2) being added to the basecoat material (bL2a) or at least one of the basecoat materials (bL2-x) that has slipped from the underlying coat.

14. The method as claimed in claim 1, wherein the joint curing (4) is carried out at temperatures of 100 to 250° C. for a time of 5 to 60 minutes.

15. The method as claimed in claim 1, wherein the substrate (S) is selected from the group consisting of metallic substrates.

16. The method as claimed in claim 1, wherein all basecoat materials (bL2-x) are one-component coating compositions.

17. The method as claimed in claim 1, wherein all basecoat materials (bL2-x) comprise at least one polymer as binder, selected from the group consisting of hydroxyfunctional polyurethanes, polyesters, polyacrylates, and copolymers of these polymers.

18. The method as claimed in claim 1, wherein all basecoat materials (bL2-x) comprise at least one color and/or effect pigment.

19. The method as claimed in claim 1, wherein all basecoat materials (bL2-x) comprise at least one melamine resin as crosslinking agent.

20. The method as claimed in claim 1, wherein the aqueous dispersion (D1) has a solids content of 21 to 25 wt. %, based on a total weight of the aqueous dispersion (D1).

* * * * *